US008899527B2

(12) United States Patent
Allen et al.

(10) Patent No.: US 8,899,527 B2
(45) Date of Patent: Dec. 2, 2014

(54) PROPELLANT TRANSFER SYSTEM AND METHOD FOR RESUPPLY OF PROPELLANT TO ON-ORBIT SPACECRAFT

(71) Applicant: MacDonald Dettwiler & Associates Inc., Brampton (CA)

(72) Inventors: Andrew Allen, Toronto (CA); John Lymer, Toronto (CA); Kerry Spring, Kanata (CA); Rangaswamy Ravindran, Caledon (CA)

(73) Assignee: MacDonald, Dettwiler and Associates Inc., Brampton, ON (CA)

( * ) Notice: Subject to any disclaimer, the term of this patent is extended or adjusted under 35 U.S.C. 154(b) by 294 days.

(21) Appl. No.: 13/678,281

(22) Filed: Nov. 15, 2012

(65) Prior Publication Data

US 2013/0119204 A1 May 16, 2013

Related U.S. Application Data

(60) Provisional application No. 61/559,801, filed on Nov. 15, 2011.

(51) Int. Cl.
  B64G 1/64       (2006.01)
  B64G 1/10       (2006.01)
  B64G 1/40       (2006.01)
(52) U.S. Cl.
  CPC  *B64G 1/64* (2013.01); *B64G 1/646* (2013.01); *B64G 1/1078* (2013.01); *B64G 1/402* (2013.01)
  USPC .................. 244/172.5; 244/172.2; 244/172.3
(58) Field of Classification Search
  USPC ........................................... 244/172.2–172.5
  See application file for complete search history.

(56) References Cited

U.S. PATENT DOCUMENTS

| 4,831,531 | A  | * | 5/1989  | Adams et al. ...................... 701/2 |
| 5,158,362 | A  | * | 10/1992 | Brauer et al. .................... 374/33 |
| 5,582,366 | A  | * | 12/1996 | Hamant et al. ............ 244/135 A |
| 6,739,555 | B2 | * | 5/2004  | Mazanek et al. ........... 244/172.4 |
| 6,843,446 | B2 | * | 1/2005  | Scott ................................ 244/10 |
| 6,969,030 | B1 | * | 11/2005 | Jones et al. ................ 244/172.5 |
| 7,114,682 | B1 | * | 10/2006 | Kistler et al. ............... 244/172.2 |
| 7,387,279 | B2 | * | 6/2008  | Anderman et al. ........ 244/158.9 |
| 7,575,200 | B2 | * | 8/2009  | Behrens et al. ............ 244/172.3 |
| 8,091,835 | B2 | * | 1/2012  | Behrens et al. ............ 244/172.3 |
| 2003/0029969 | A1 | * | 2/2003  | Turner ...................... 244/158 R |

(Continued)

FOREIGN PATENT DOCUMENTS

WO    2008066512    6/2008

OTHER PUBLICATIONS

PCT International Search Report dated Feb. 28, 2013.
Kosmas, C., On-Orbit-Servicing by "HERMES On-Orbit-Servicing System", Policy Robust Planning, American Institute of Aeronautics and Astronautics, SpaceOps 2006 conference proceedings, pp. 1 to 6, Apr. 26, 2006.
A satellite fluid transfer system is disclosed in a paper by Scott Rotenberger, David SooHoo, Gabriel Abraham, Orbital Express Fluid Transfer Demonstration System in Sensors and Systems for Space Applications II, edited by Richard T. Howard, Pejmun Motaghedi, Proc. of SPIE vol. 6958, 695808, (2008).

*Primary Examiner* — Christopher P Ellis
*Assistant Examiner* — Medhat Badawi
(74) *Attorney, Agent, or Firm* — Hill & Schumacher; Lynn C. Schumacher

(57) ABSTRACT

Herein is disclosed a propellant transfer system and method for refueling on-orbit spacecraft. The system and method are configured to allow for resupply of spacecraft configured to be fueled by either a bipropellant (oxidizer and fuel) or a monopropellant (typically hydrazine). The system and method are particularly suited for resupply of satellites not originally prepared for refueling as well but the system may also be used for as satellites specifically designed for refueling.

29 Claims, 33 Drawing Sheets

(56) References Cited

U.S. PATENT DOCUMENTS

| | | | |
|---|---|---|---|
| 2006/0145024 A1* | 7/2006 | Kosmas .................... | 244/172.5 |
| 2006/0151671 A1* | 7/2006 | Kosmas .................... | 244/172.6 |
| 2007/0051854 A1* | 3/2007 | Behrens et al. ............ | 244/172.3 |
| 2007/0228219 A1* | 10/2007 | Behrens et al. ............ | 244/172.5 |
| 2007/0228220 A1* | 10/2007 | Behrens et al. ............ | 244/172.5 |
| 2008/0121759 A1* | 5/2008 | Behrens et al. ............ | 244/172.3 |
| 2008/0237400 A1* | 10/2008 | Gryniewski et al. ....... | 244/172.2 |
| 2011/0031352 A1* | 2/2011 | Behrens et al. ............ | 244/172.5 |

\* cited by examiner

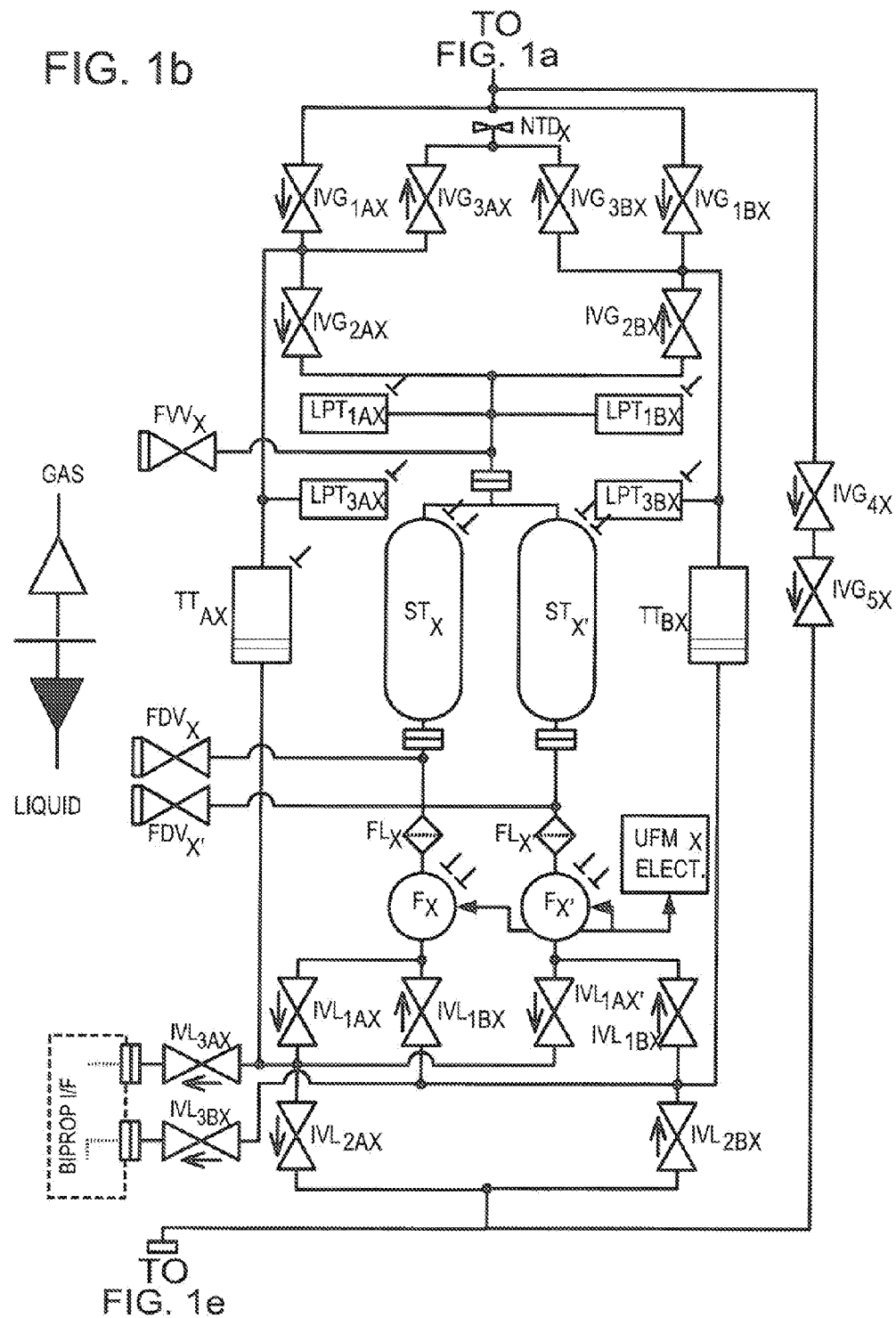

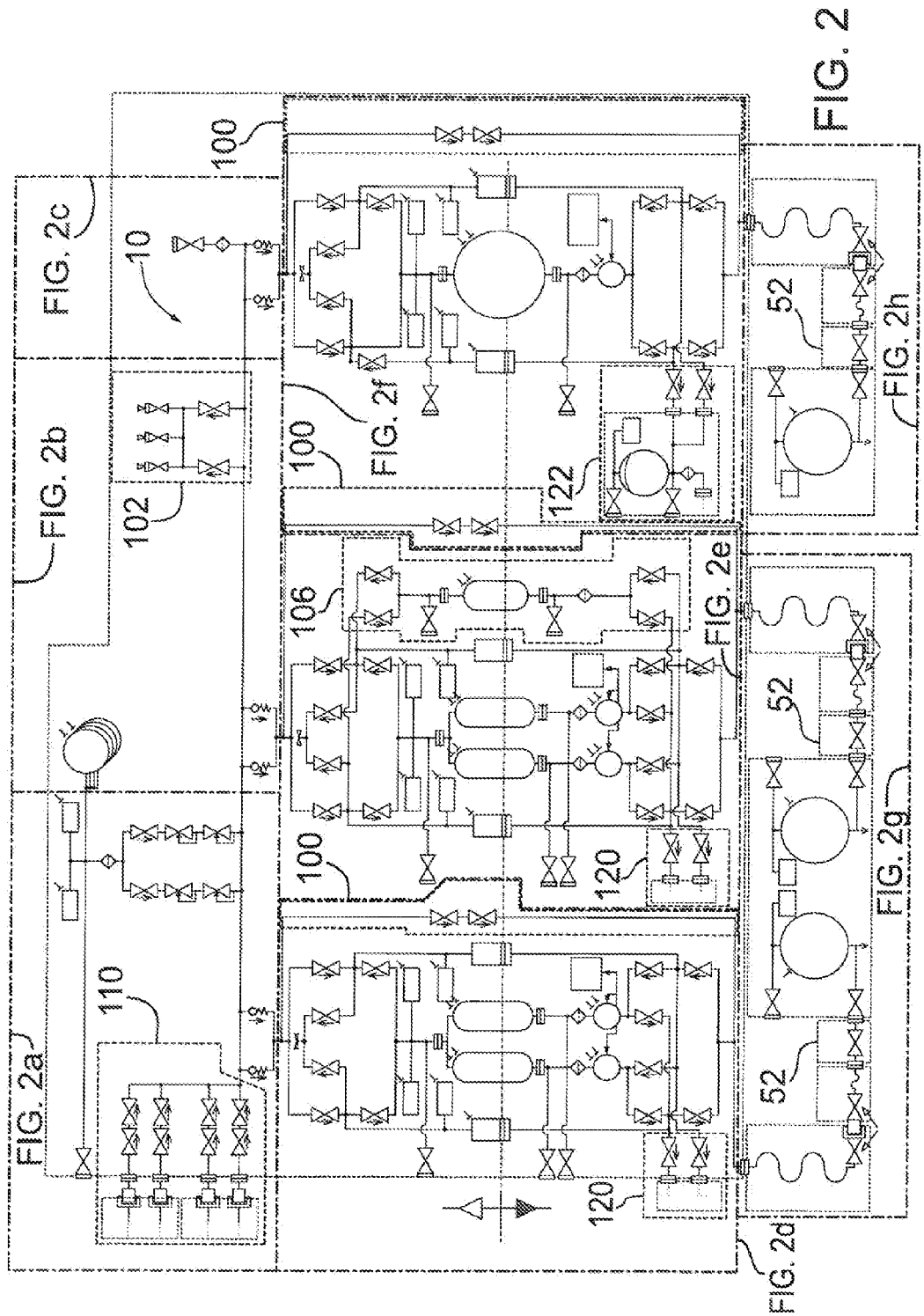

PROPELLANT TRANSFER SYSTEM AND METHOD FOR RESUPPLY OF PROPELLANT TO ON-ORBIT SPACECRAFT

CROSS REFERENCE TO RELATED U.S. PATENT APPLICATION

This patent application relates to U.S. provisional patent application Ser. No. 61/559,801 filed on Nov. 15, 2011, entitled PROPELLANT TRANSFER SYSTEM AND METHOD FOR RESUPPLY OF FLUID PROPELLANT TO ON-ORBIT SPACECRAFT, filed in English, which is incorporated herein in its entirety by reference.

FIELD

The present disclosure relates to a method and system for on-orbit fluid (i.e., liquid or gas) propellant resupply (or propellant removal) of artificial satellites either near the end of their originally scheduled lifetime or at any point in their life after an anomalous orbit insertion, another commissioning problem, or greater than planned maneuvering during nominal operations. More particularly the system and method are designed for resupply of satellites not originally prepared for refueling as well as satellites designed for refueling.

BACKGROUND

Many satellites currently in operation were designed with a finite amount of propellant and were not designed for the possibility of being resupplied with propellant. The design philosophy relied upon replacement of the satellites after they had exhausted the on-board propellant supply. In view of the expense of replacing satellites, it would be very advantageous to be able to resupply satellites with propellant which are either near their end of propellant life but otherwise functional, or have suffered an infant propulsion system failure or insertion anomaly, or have been maneuvered more than originally intended for their nominal operations, thereby extending their operational life by several or many years.

It is estimated that as many as half of all GEO communication satellites end their 10 to 15 year life with all or most of their subsystems still functional and it is only the depletion of the carefully budgeted propellant load that drives retirement of the satellite. Using a current economic model, the ability to refuel several of these end-of-life satellites in a single mission would cost-effectively extend each of their useful lives by 3 to 5 years and thereby delay the need to outlay the very high capital costs to launch a replacement for each satellite if desired. Some satellites suffer from primary propulsion system failures or launch vehicle upper stage related failures soon after they are launched. In these cases the entire book value must be written off and compensation paid to the operator by the insurer. The satellite becomes an asset of the insurer and will eventually have to be disposed of in a graveyard or re-entry orbit. If these assets can be resupplied with propellant, enabling them to transfer to an orbital station in geosynchronous orbit and extending their life by 5 to 10 years, most or all of the value of the satellite can be recovered.

The key technical difficulty is that these satellites were not designed for robotic servicing, and it is not generally accepted that such missions are technically possible. Specifically, most satellites are designed with propellant fill and drain valves that were intended to be filled once prior to launch and never opened or manipulated following launch. Thus, accessing these fill and drain valves remotely in-orbit presents several major challenges and would involve several operations, each of which is difficult to accomplish robotically including: cutting and removal of the protective thermal blankets, removal of several lockwires hand wrapped around the valves, unthreading and removing outer and inner valve caps, mating a propellant fill line to the valve nipple, mechanically actuating the valve and, when propellant resupply is complete, replacing the inner valve cap.

On-orbit servicing has been the subject of much study over the past thirty years. The idea of maintaining space assets, rather than disposing of and replacing them, has attracted a variety of ideas and programs. So far, the concept has only found a home in the manned space program where some success can be attributed to the Solar Max and Hubble Space Telescope repair missions, Palapa-B2 and Westar rescue missions, and the assembly and maintenance of the International Space Station.

Until recently there have been no technologies disclosed that can solve the problem of accessing the propellant system of an unprepared satellite for the purpose of replenishing station-keeping propellant. The majority of satellites in orbit today were not designed with orbital propellant resupply in mind and access to the propellant system is designed to be accessed by a human on earth before launch. The technologies required to access the client spacecraft's propellant system for the purposes of propellant resupply still have a very low technology readiness level, and are generally considered to be the main obstacle to a successful servicing mission.

Transferring propellants used for spacecraft propulsion systems from one source to another can be very dangerous due to the corrosive and explosive nature of many of the fluids involved. For example, inadvertent mixing of fuel and oxidizer in bipropellant systems will cause immediate combustion, so a fluid transfer system for bipropellant needs to ensure that no accidental mixing occurs.

Therefore, it would be very advantageous to provide a propellant transfer system for transferring propellant from a servicing spacecraft to a client satellite which has flexibility to deliver propellant using more than one modality depending on the circumstances of the satellite, propellant system parameters, and the like. It would be very advantageous for such a system to able to able to transfer bipropellants in addition to monopropellants, pressurants, and ion or plasma propulsion propellants.

SUMMARY

The present disclosure relates to a propellant transfer system and method for on-orbit propellant resupply of an artificial satellite. The system and method are configured to allow for propellant resupply of a satellite configured to use either a bipropellant oxidizer and fuel and/or a monopropellant and/or a pressurized gas propellant or pressurant. The system and method are particularly suited for propellant resupply of satellites not originally prepared for propellant resupply but the system may also be used for satellites specifically designed for propellant resupply later in their operational life.

Disclosed is a system mounted on a servicer spacecraft for transferring fluid to a client satellite, the client satellite including at least one storage tank having at least a first fluid transfer coupling, comprising:

a) a fluid storage and routing system for storing and routing fluid from the servicing spacecraft to the at least one storage tank on the client satellite, the storage and routing system including
at least one pressurized tank containing a pressurized gas, at least one fluid storage tank, and an associated fluid transfer coupling, first and second flow paths connecting the at least one fluid storage tank, the at least one pressurized gas tank and the associated fluid transfer coupling; and b) a flow control system configured for detecting and adjusting pressure and flow rate of the gas and fluid through the first and second flow paths, detecting pressure in the at least one storage tank on the client satellite once the associated fluid transfer coupling is coupled to the fluid transfer coupling on the client satellite, transferring fluid from said fluid tank, using pressurized gas, to said at least one storage tank on the client satellite via said first flow path at a pressure less than or equal to a pressure of the at least one pressurized gas tank, or via said second flow path at a pressure greater than a pressure of the at least one pressurized gas tank.

There is also disclosed system mounted on a servicer spacecraft for transferring fluid to a client satellite, the client satellite including at least one storage tank having at least a first fluid transfer coupling, comprising:

a) means for storing and routing fluid from said servicing spacecraft to the at least one storage tank on the client satellite; and b) means for controlling flow of gas and fluid, said means for controlling flow of gas and fluid configured for detecting and adjusting pressure and flow rate of said gas and fluid through said first and second flow paths, detecting pressure in the at least one storage tank on the client satellite once said associated fluid transfer coupling is coupled to the fluid transfer coupling on the client satellite, transferring fluid from said fluid tank to said least one storage tank on the client satellite using the pressurized gas via said first flow path at a pressure less than or equal to a pressure of the at least one pressurized gas tank, or via said second flow path at a pressure greater than a pressure of the at least one pressurized gas tank.

There is also disclosed a propellant transfer system mounted on a servicer satellite for transferring bipropellant and/or monopropellant between the servicer satellite and propellant tank of client satellites configured for propulsion with bipropellant and/or monopropellant respectively, each client satellite having a fill/drain valve associated with each propellant tank for accessing the propellant storage tank, comprising:

a) first, second and third propellant transfer subsystems, each propellant transfer subsystem including, at least one pressurized tank containing a pressurized gas, at least one propellant storage tank, the at least one propellant storage tank and the at least one pressurized gas tank being in flow communication with each other through a routing tube system;

b) a flow control system integrated with the interconnecting tube system for detecting and adjusting pressure and flow rate of the gas and propellant, and detecting pressure in the client satellite propellant storage tank once the propellant transfer subsystem is coupled to the client satellite and the fill/drain valve on the client satellite propellant tank is open, c) a command and control system interfaced with the flow control system of each propellant transfer subsystem, the command and control system being configured to regulate pressure and flow rate of propellant between each propellant transfer subsystem and associated client satellite propellant tanks based on a detected pressure of the client satellite propellant tank; and d) a communication system configured to provide communication between the command and control system and a remote operator for remote teleoperator control, or a mixture of teleoperator control and supervised autonomy control, or fully autonomous control of propellant transfer operations between the first, second and third propellant transfer subsystems and the client satellite propellant tanks and the associated propellant tanks on the client satellite.

Also disclosed is a method of refueling a client satellite, comprising:

a) maneuvering a servicer spacecraft into close proximity to a client satellite in a position and orientation suitable to releasibly couple the client satellite to the servicer spacecraft, releasibly coupling the client satellite to the servicer satellite;

b) deploying, and commanding, a robotic arm mounted on the servicer spacecraft to releasibly grasp a multifunction tool, commanding the robotic arm to manipulate the multifunction tool to access a fill/drain valve on the client satellite in flow communication with a storage tank on the client satellite;

c) commanding the robotic arm to sequester the multifunction tool and releasibly grasp a refueling tool, commanding the robotic arm to manipulate the refueling tool to releasibly grasp a propellant outlet hose connected to a propellant transfer system and mate it to the fill/drain valve;

e) opening the fill/drain valve and measuring a pressure in the client satellite storage tank and based on the measured pressure, configuring a flow control system mounted on the servicer satellite to dispense propellant under regulated pressure and flow rate conditions suitable for the measured pressure;

f) commanding the configured flow control system of the propellant transfer system to transfer propellant from a propellant storage tank on the servicer spacecraft through a piping system to the propellant hose to the storage tank on the client satellite;

g) once a desired quantity of propellant has been transferred to the client satellite, commanding the robotic arm to manipulate the refueling tool to close the fill/drain valve;

h) demate the propellant hose from the fill/drain valve and sequester it; and i) sequestering the robotic arm and decoupling the servicer spacecraft from the client satellite.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 2 shows the schematic drawing of FIG. 1 assembled in one Figure but now identifying various optional subsystems.

DETAILED DESCRIPTION

Figure 1:
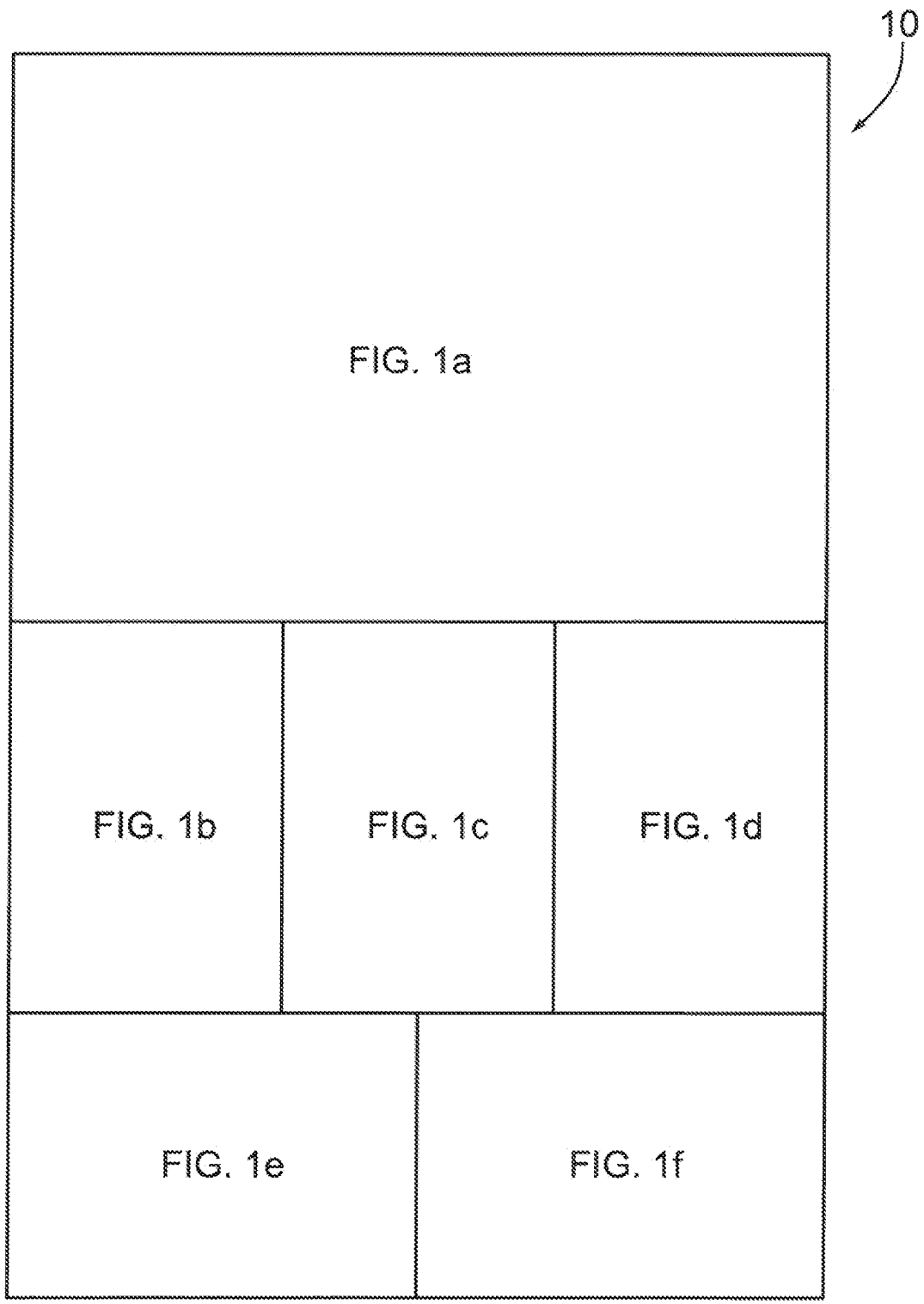
FIG. 1 shows a simple block diagram indicating how the entire propellant transfer system shown in FIGS. 1a to 1f relate to each other.
Figure 1A:
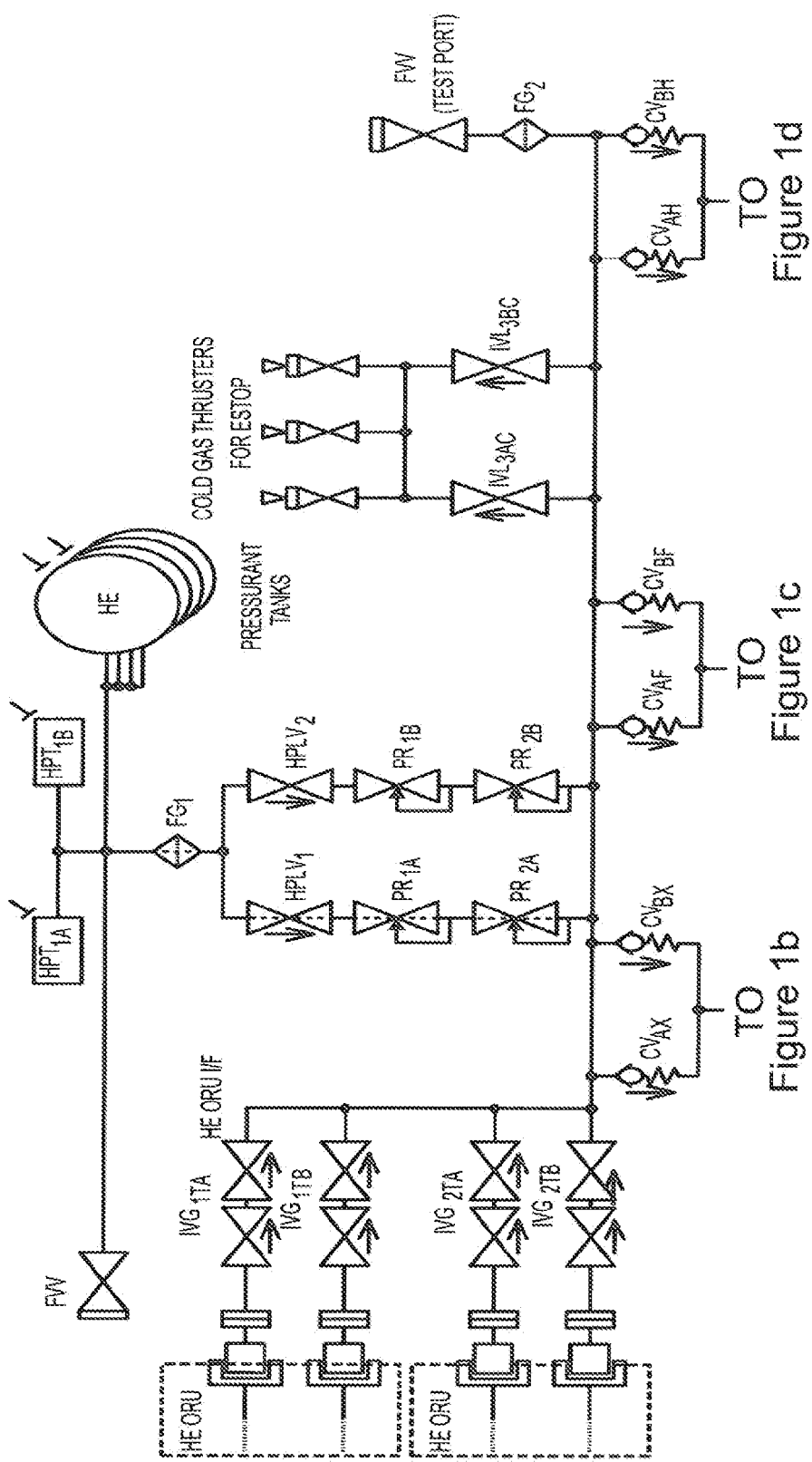
Figure 1C:
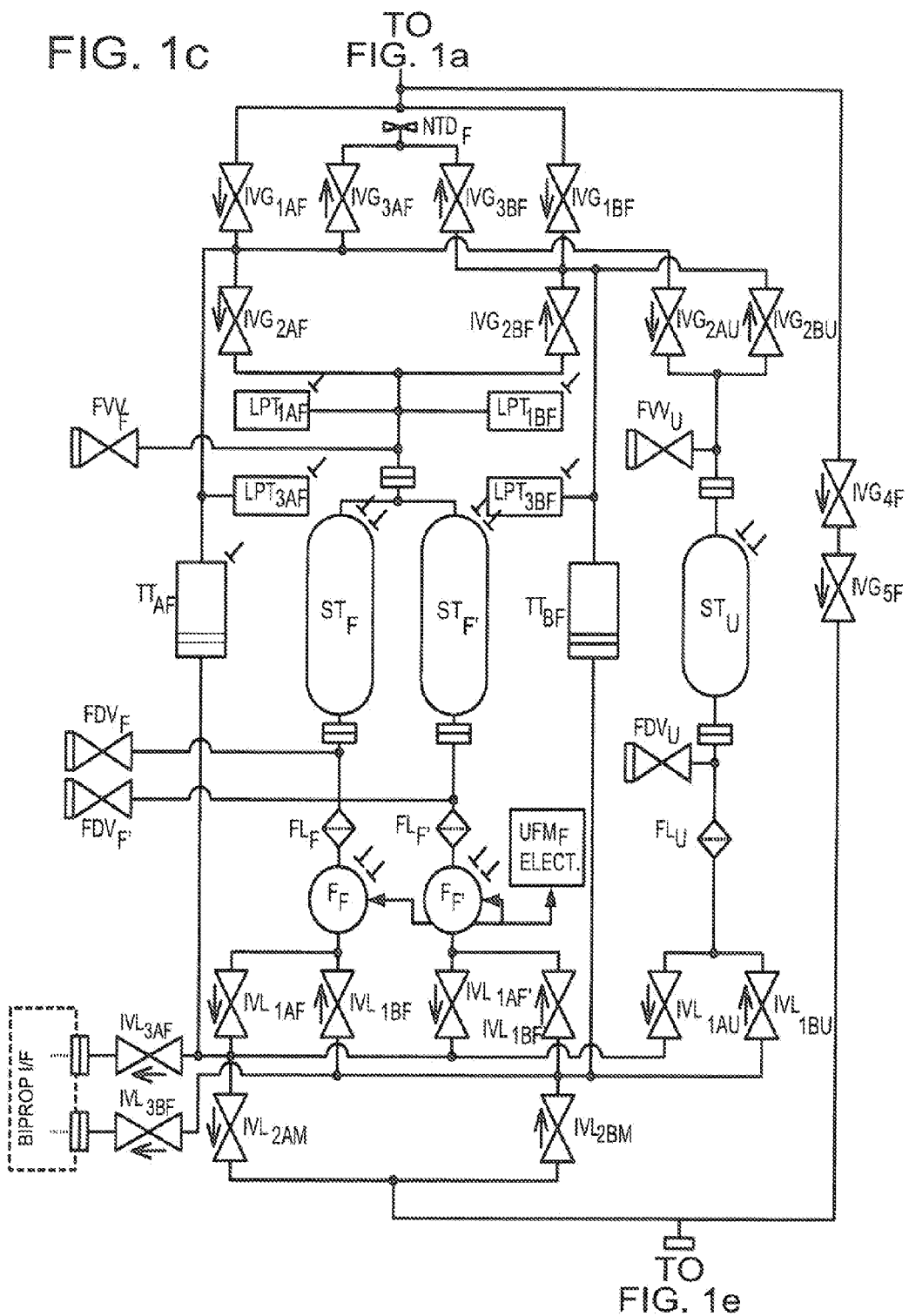
Figure 1D:
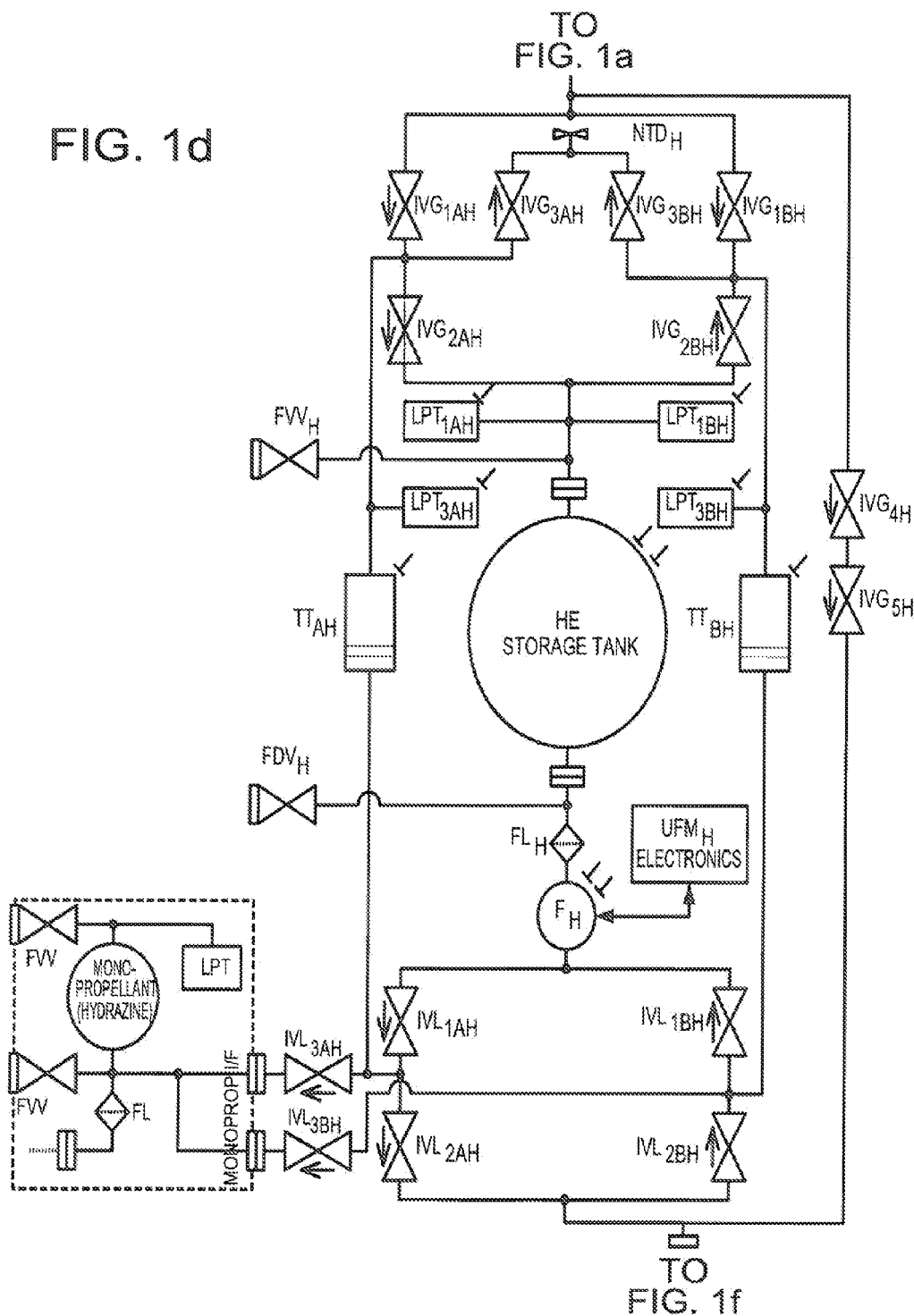
Figure 1E:
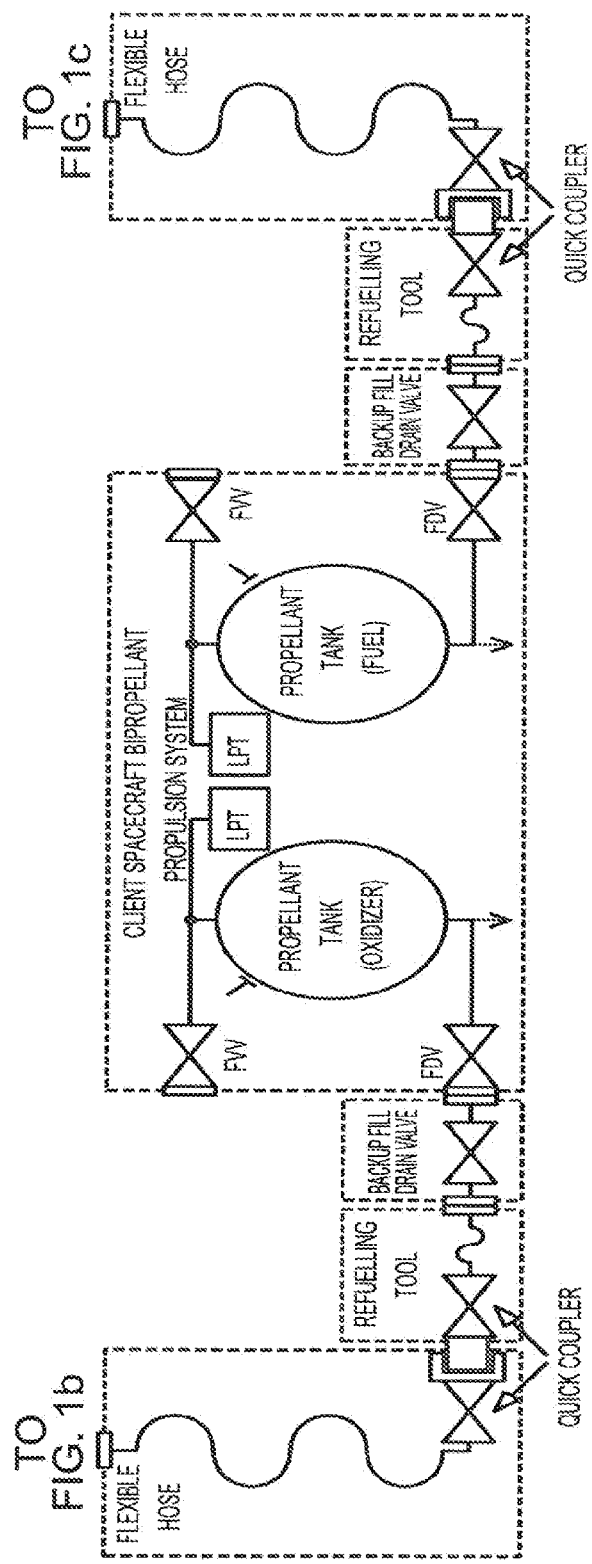
Figure 1F:
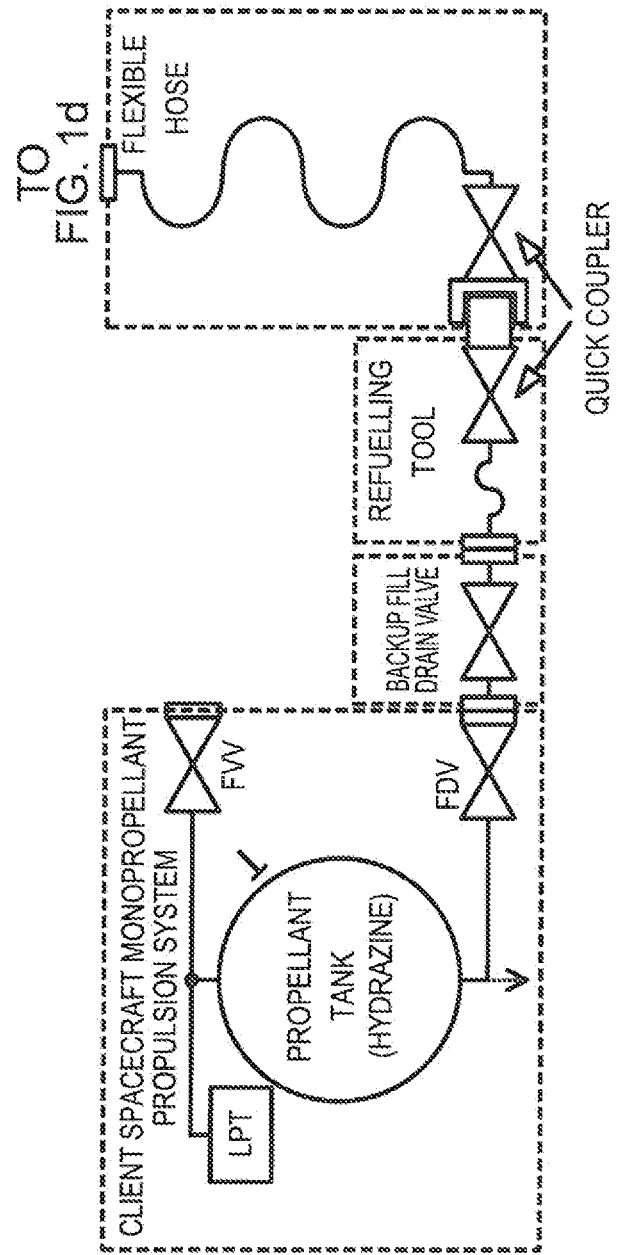
Figure 2A:
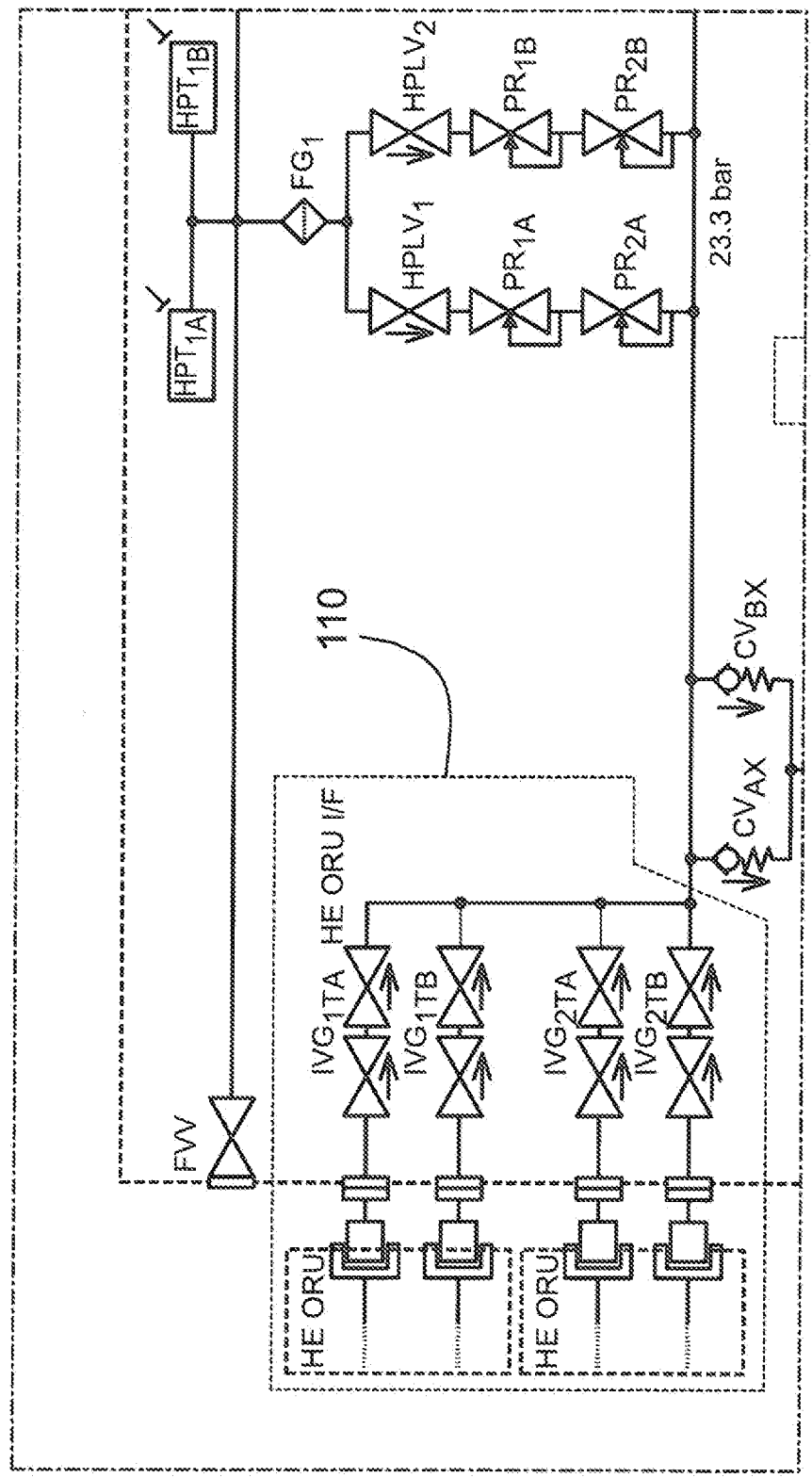
FIGS. 2a to 2h show expanded views of sections of the schematic of FIG. 2.
Figure 2B:
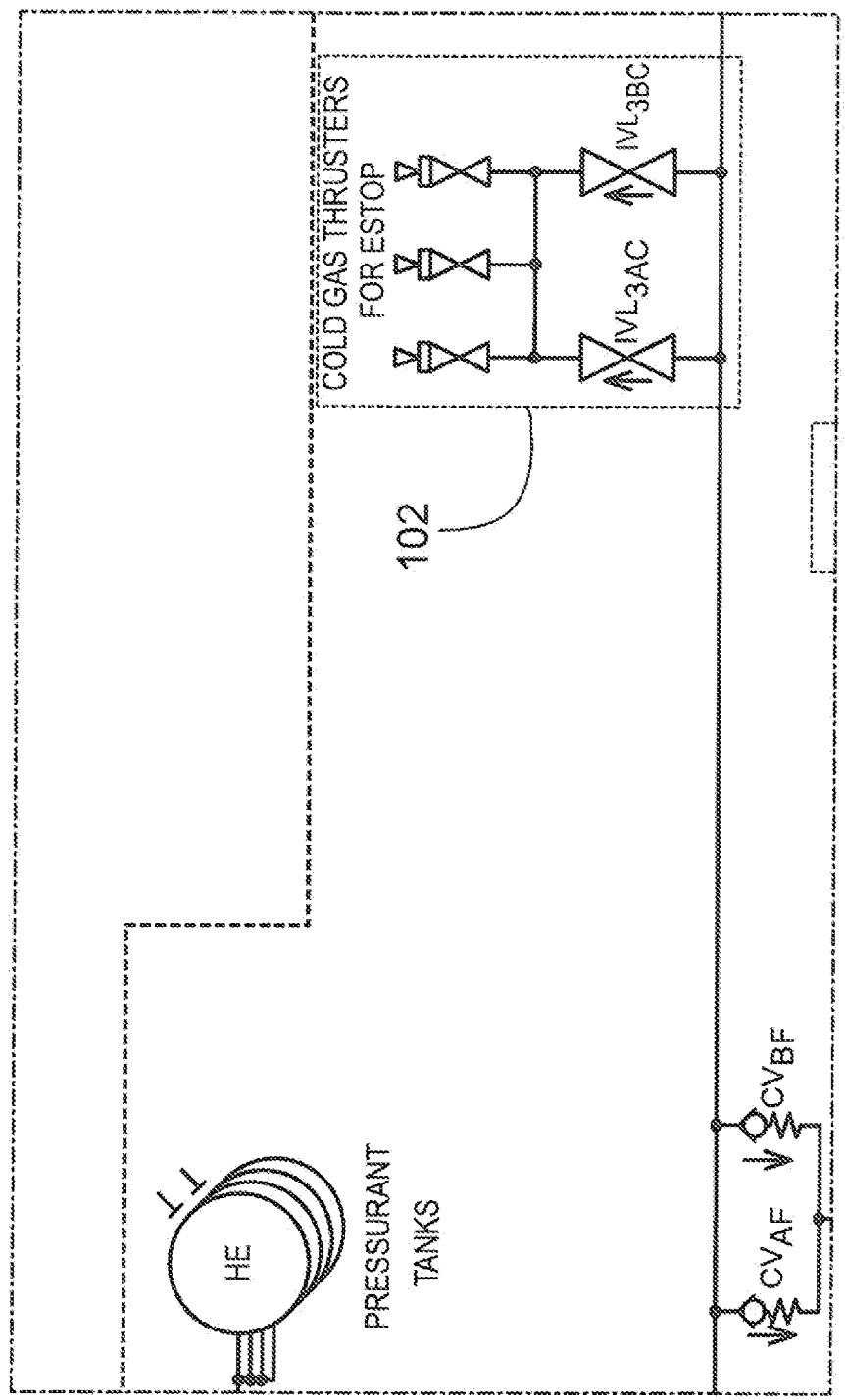
Figure 2C:
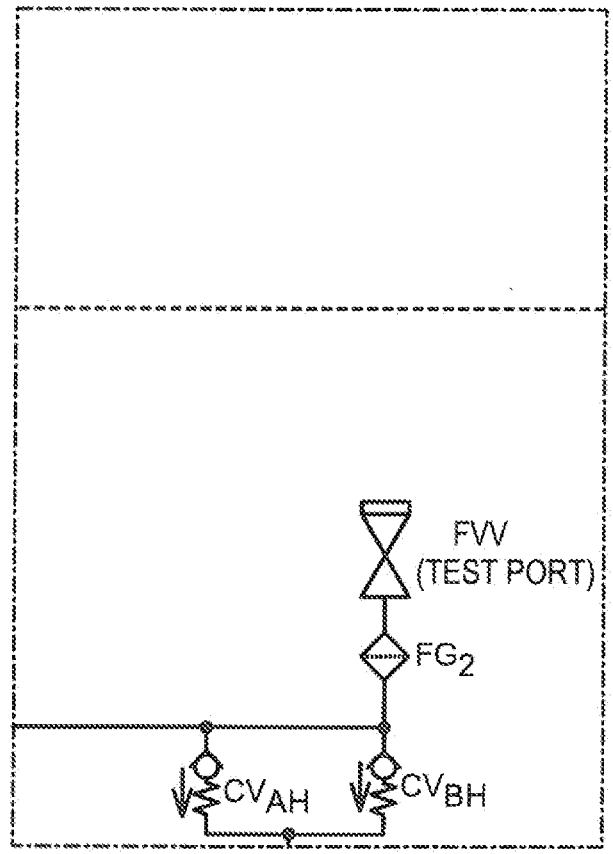
Figure 2D:
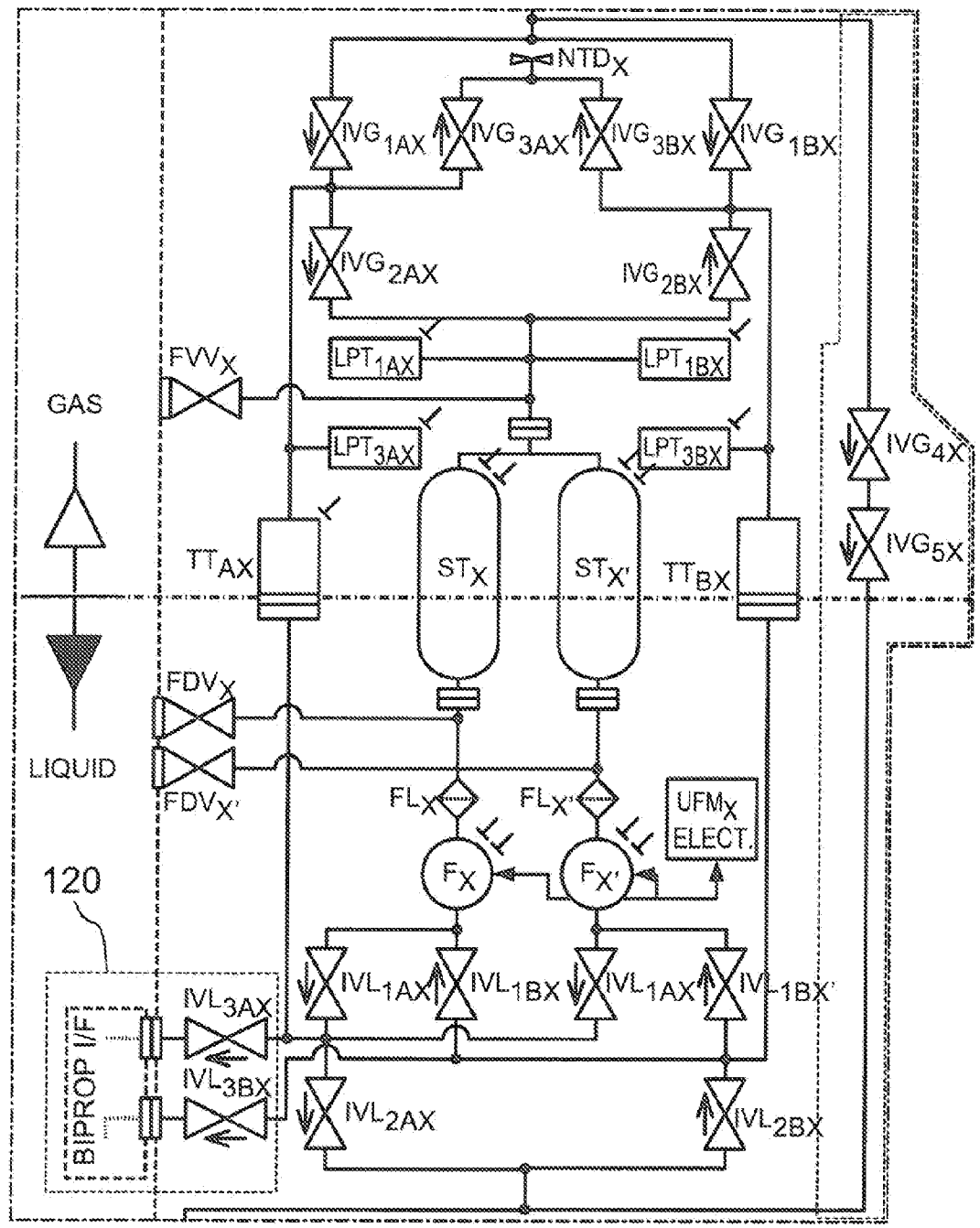
Figure 2E:
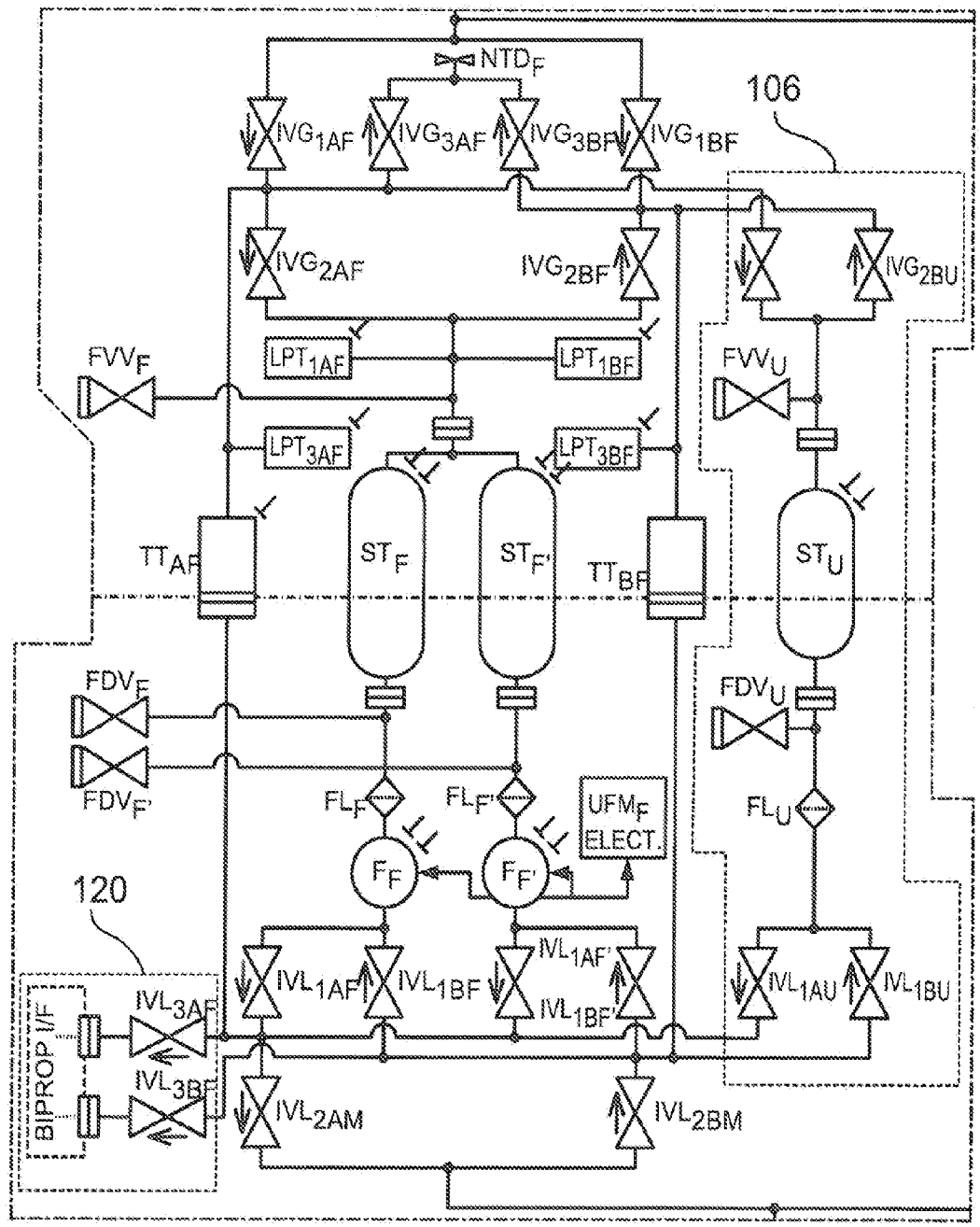
Figure 2F:
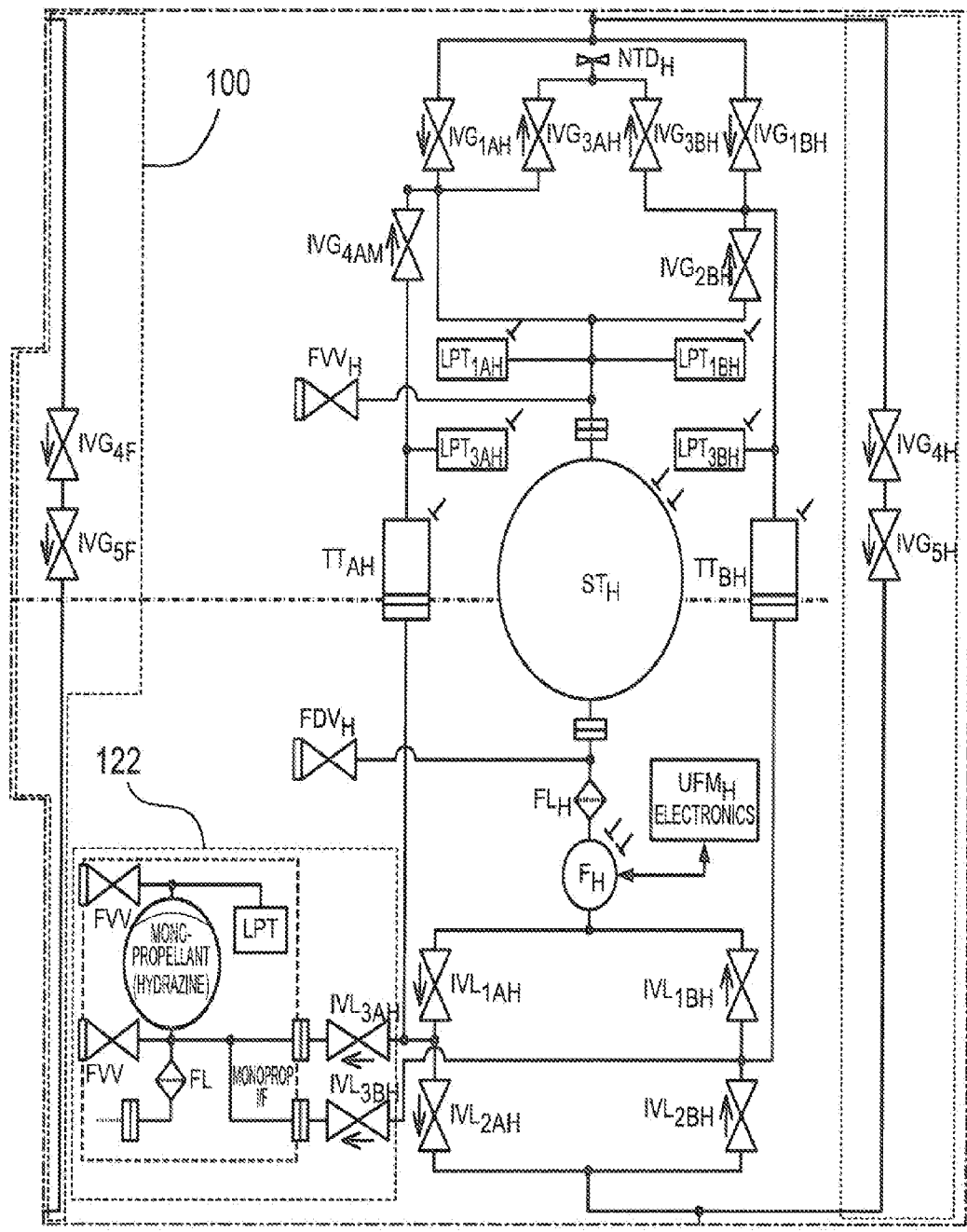
Figure 2G:
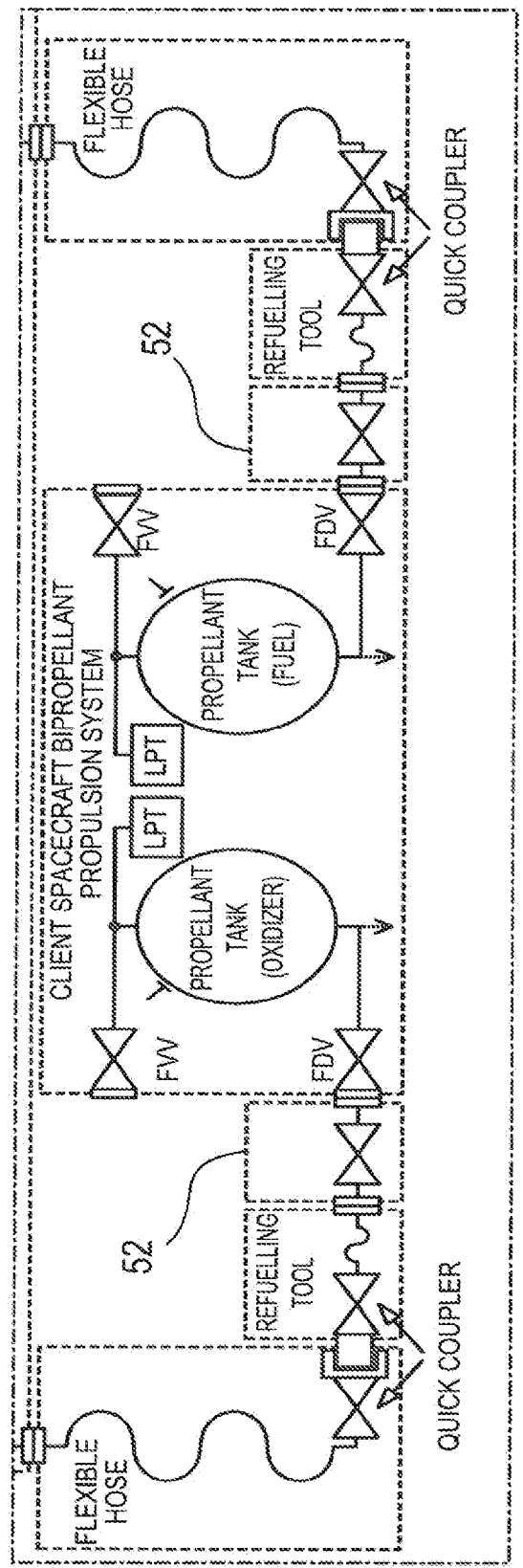
Figure 2H:
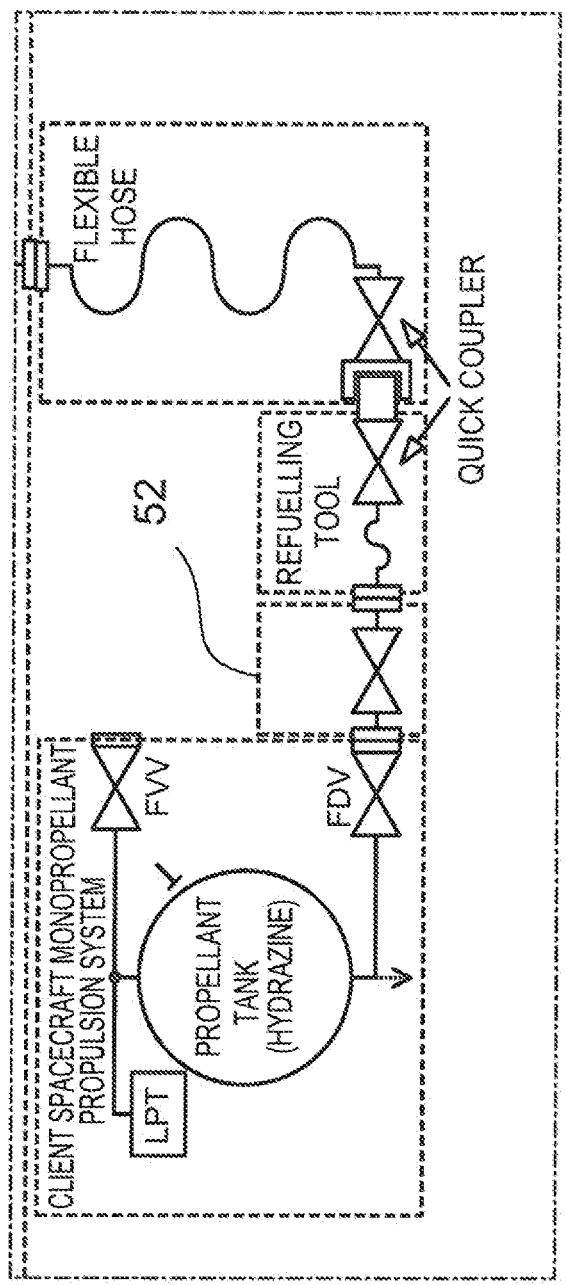

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps, or components are included. These terms are not to be interpreted to exclude the presence of other features, steps, or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures, or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein the term or "satellite" being resupplied with propellant refers to artificial satellites.

As used herein, the phrase "backup fill/drain valve" refers to valve attached to the client satellites fill/drain valve that can be closed and left behind should it prove not possible to properly close the client fill/drain valve (i.e., a leak through the client fill/drain valve is detected) after the completion of propellant transfer operations.

Definitions of Component Symbols

The following list of parts and their function is given below.

CV refers to Check Valves and are used to prevent backflow of gas (which may be contaminated with propellant vapor) back to the tubing downstream of the regulators and upstream of the check valves. Mixing of oxidizer vapor with fuel or monopropellant vapor must be prevented as the two would react on contact.

F—refers to Flow Meter transducers and are used to measure the propellant flow rate. In the prototype an ultrasonic flow meter is employed, which achieves the desired flow rate measurement accuracy and avoids any contact of sensitive transducer parts to corrosive propellants.

FDV—refers to Fill/Drain Valves and are used to load/unload fluid (propellant) into/from the various propellant tanks.

FVV—refers to Fill/Vent Valves and are used to load/unload gas (pressurant) into/from the pressurant tanks, or are used to access the tubing for pressure testing.

FG—refers to gas filters which are used to prevent particulate contaminates in the pressurant tanks or form outside the system from migrating downstream where it might otherwise interfere with valve operation.

FL—refers to Filters and are used to prevent particulate contaminates in the storage tanks from migrating downstream where it might otherwise interfere with valve operation.

HPLV—refers to High Pressure Latch Valve and are used to isolate the downstream regulators from the high pressure source during launch.

HPT—refers to High Pressure Transducer and are used to measure the pressure of the high pressure portion of the system.

IVG—refers to Gas Isolation Valves and are used to control the flow of gas from the high pressure section to the transfer tank ($IVG_1$), between the storage tank and the transfer tank ($IVG_2$), and from the transfer tank to space ($IVG_3$).

IVL—refers to Liquid Isolation Valve and are used to control the flow of fluid (propellant) between the storage tank and the transfer tank/(or a pump) ($IVG_1$), and between the transfer tank/pump of the propellant transfer system on the servicer spacecraft and the propellant tank on the client satellite ($IVG_2$).

LPT—refers to Low Pressure Transducer and are used to measure the pressure at various parts of the system.

NTD—refers to non-thrusting devices and are used to vent pressurant to space without generating thrust which would otherwise disturb the servicer+client spacecraft attitude and/or orbit.

PR—refers to pressure regulators which act to reduce the upstream gas pressure from a high value (up to about 320 bar) in the pressurant storage tanks to a lower downstream value (no higher than 30 bar) for pressurizing the propellant storage tanks and operating the transfer tanks.

ST—Refers to the propellant Storage Tanks and are used to store all the propellant to be transferred to the client satellite and potentially also to be used by the servicer spacecraft propulsion system for orbit maneuvers. They are filled with propellant prior to launch, but can also be resupplied with propellant when in orbit.

TT—refers to Transfer Tanks and are used for several purposes including relief of the flex hose pressure between client satellite propellant transfer operations, as a 'pump' to transfer propellant cyclically from the storage tanks against a pressure gradient to the client, as a calibrated volume to check the flow meter performance, and as a back-up means of propellant metering using a simple count of cycles. The transfer tanks are small and have separate gas and fluid volumes separated by a diaphragm or a sealed sliding piston. The transfer tank, in combination with its associated valves, is essentially a pneumatically powered positive displacement pump. It could be replaced by some other form of pump such as a motor-driven piston pump, gear pump, or diaphragm pump. These alternative embodiments may be employed particularly if gas-phase propellants are being used instead of liquid propellants.

UFM Electronics—refers to the (ultrasonic) flow meter electronics which are used to interface to the flow meter transducer.

The symbol ■—refers to thermistors which are used measure the temperature of associated equipment of the propellant transfer system.

He—refers to gas pressurant which is used to displace fluid propellant. Other non-reactive gases such as nitrogen (N) could also be used, but helium (He) is preferred for space application due to its lower mass. The Helium is stored at high pressure in pressurant tanks in the high pressure section.

F—refers to liquid bipropellant fuel and is delivered to the client satellite. It reacts with oxidizer to produce thrust. A typical liquid fuel is monomethyl hydrazine (MMH), though other fuels such as hydrazine ($N_2H_4$) or unsymmetric dimethyl hydrazine (UDMH) may also be used.

U—refers to a second chemically compatible liquid bipropellant fuel. If the primary fuel is MMH, then a suitable second fuel would be UDMH.

H—refers to liquid monopropellant and is delivered to clients. It disassociates in the presence of a catalyst to produce thrust. It also can act like a fuel in that it reacts with oxidizer to produce thrust. A typical monopropellant is hydrazine ($N_2H_4$) though other monopropellants such as ammonia ($NH_3$) may also be used.

X—refers to liquid bipropellant oxidizer and is delivered to clients. It reacts with fuel to produce thrust. A typical liquid oxidizer is a mixture of oxides of nitrogen with 97% $N_2O_4$ and 3% NO (MON3), though other oxidizers such as fuming nitric acid may also be used.

FIG. 1 shows a schematic drawing of the complete propellant transfer system shown generally 10, due to the complexity of the system it is broken up in sections shown from FIGS. 1a to 1f. The component labels associated with all valves, sensors, pressure transducers, etc. are defined above. All redundant components, such as valves, pressure transducers and the like shown in FIGS. 1 to 7b have a 'B' in the subscript of their labels (as compared to 'A' for the equivalent prime components). In addition to these Figures showing the redundant components, FIGS. 2a to 2h, the optional subsystems of system 10 are shown.

FIG. 1 shows a schematic drawing of the complete propellant transfer system shown generally at 10. The components associated with all valves, sensors, pressure transducers, etc. are defined above. All redundant components, such as valves, pressure transducers and the like shown in FIGS. 1 to 7b have a 'B' in the subscript of their labels (as compared to 'A' for the equivalent prime components). In addition to these Figures showing the redundant components, FIG. 2, the optional subsystems of system 10.

For example, the propulsion interfaces 120 associated with the bipropellant transfer subsystems, and propulsion interface 122 associated with the monopropellant transfer subsystem are optional. These interfaces supply bipropellant (fuel and oxidizer) and/or monopropellant to the servicer spacecraft propulsion system. This reduces the overall mass of the servicer spacecraft by avoiding the need for separate propellant tanks in the propulsion system. It also allows the propellant to either be delivered to client spacecraft or to be used by the servicer spacecraft for orbit maneuvers. Such orbit maneuvers may be used, for example, to rendezvous with the client spacecraft or even to change the client spacecraft orbit (while the servicer spacecraft is docked to the client spacecraft).

Further, the cold gas thruster subsystem 102 is also optional. Cold gas thrusters could be useful to arrest and/or reverse the final approach of the servicer spacecraft to the client spacecraft just prior to docking in the event of an anomaly. Using the high pressure supply of the propellant transfer system would avoid the need for a second source of gas for cold gas thrusters.

The alternative propellant string 106 for the fuel (and/or oxidizer) transfer subsystem is also optional. One or more of them could provide a means of delivering additional chemically-compatible fuel (or oxidizer) types without the addition of other complete propellant transfer subsystems 14 (or 12). For the example, using MMH (monomethyl hydrazine) as the primary fuel, a potential secondary fuel would be UDMH (unsymmetric dimethyl hydrazine), but other secondary fuel types are also possible depending on the primary fuel. Small amounts of these two fuels would mix in the transfer tank/pump and downstream components when alternating between delivering the two, but this mixing is typically tolerable within the fuel purity specifications defined by the military standards for these bipropellant fluids.

The Helium ORU (Orbital Replaceable Unit) interface 110 is optional. It provides a fluid interface through which additional pressurant could be provided to the servicer spacecraft thereby extending its useful life. Fluid propellant can be resupplied to the propellant transfer system by venting pressurant from the propellant storage tanks and then reversing the propellant transfer process to transfer propellant from some other spacecraft to the servicer spacecraft. The other spacecraft can be a retired one that still has propellant remaining or it can be a purpose-built 'tanker' spacecraft. Resupplying pressurant is more challenging due to the high pressure in the servicer spacecraft pressurant storage tanks. It is proposed, therefore, that pressurant be provided at low pressure through the He ORU interface. The He ORU would be carried to the servicer spacecraft by the tanker spacecraft and then transferred to the servicer using the servicer's robotic arm.

The pressurant resupply lines 100 are optional. These lines and the associated redundant valves ($IVG_4$ and $IVG_5$) would be used to resupply the client with pressurant should the pressure in the client propellant tanks be too low. For clients with PMD (propellant management device) type propellant tanks, pressurant resupply is possible through the client satellite propellant fill/drain valve as there is no physical barrier between the propellant and pressurant. The pressurant bubble in the propellant line would be flushed out by propellant during subsequent propellant resupply. For clients with bladder or diaphragm type tanks, pressurant resupply would have to be through an appropriate pressurant fill/vent valve but only if the pressure here is within the capability of the propellant transfer system.

Figure 3:
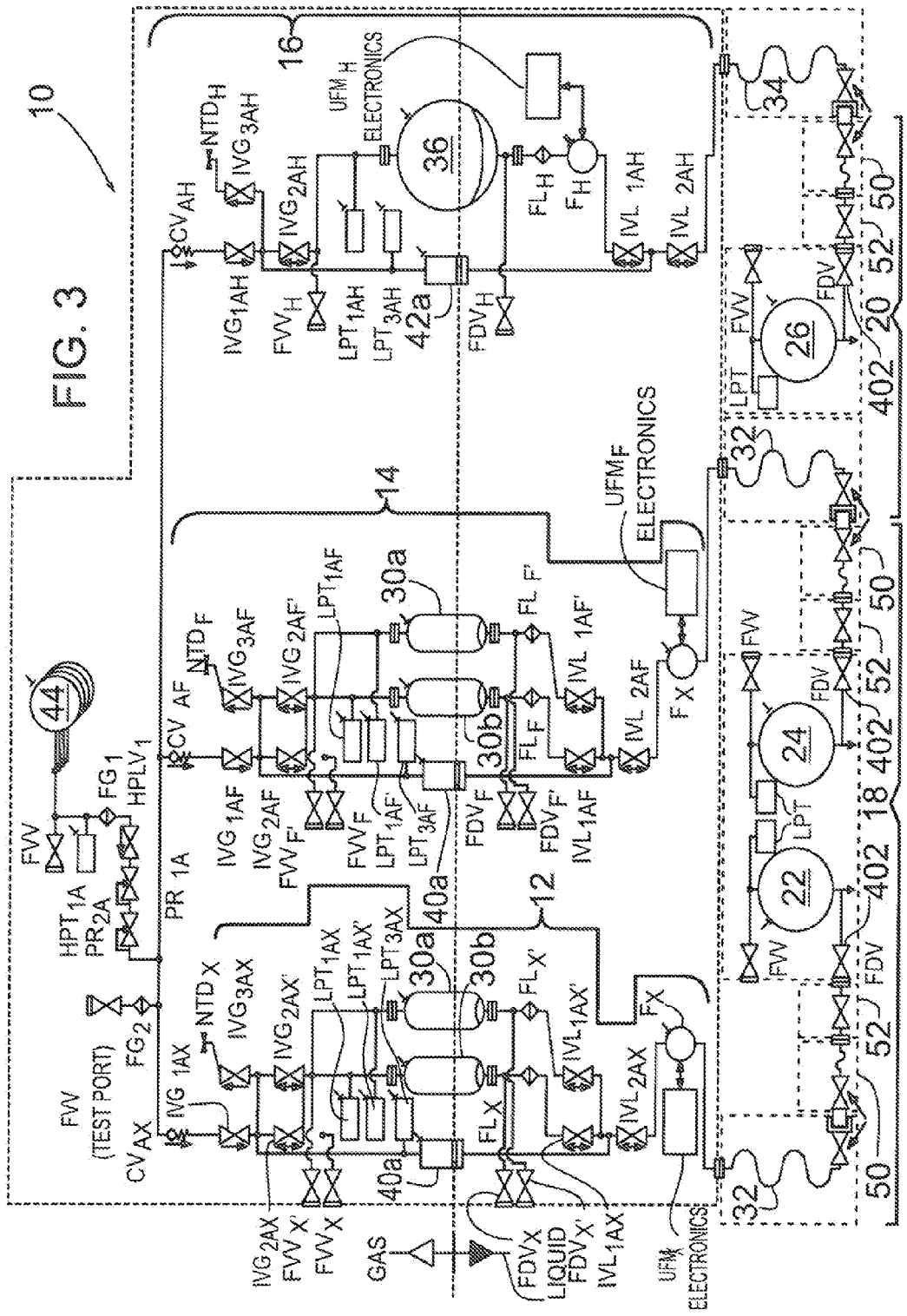
FIG. 3 shows a schematic drawing of propellant transfer system but now but absent all optional and redundant subsystems.

FIG. 3 shows a schematic drawing of the propellant transfer system 10 absent the optional subsystems 100, 102, 106, 110, 120 and 122 discussed above. The propellant transfer system 10 includes a first propellant transfer subsystem 14 for resupplying the fuel tank of satellites configured to use a bipropellant (fuel and oxidizer) system and containing a second subsystem 12 for resupplying the oxidizer tank of the client satellite. Propellant transfer system 10 includes a third propellant transfer subsystem 16 configured to refuel a storage tank 36 on a satellite configured to use a monopropellant. FIG. 3 also shows all the subsystems 12, 14 and 16 coupled to the respective propellant tank on the satellite being refueled, specifically oxidizer transfer subsystem 12 coupled to propellant tank 22 for storing the oxidizer and subsystem 14 coupled to a propellant tank 24 for storing the fuel on a satellite configured to use the bipropellant. Subsystem 16 is shown coupled to a propellant tank 26 for storing monopropellant on a satellite configured to use a monopropellant. In all cases, whether transferring monopropellant or the bipropellant, a backup fill/drain valve 52 is first mated to the drain/fill valves of the client satellites. Backup fill/drain valve 52 will be discussed in more detail hereafter.

Subsystems 12 and 14 each contains two (2) flow meter transducers and storage tanks 30a, 30b are identical as can be seen from FIG. 3. Each of subsystems 12 and 14 are configured with redundancy options as noted above so each contains two (2) sets of tubing, valves, and pressure transducers, and transfer tanks 40a and 40b. Pressurant gas flows from the high pressure helium storage tank 44 to the storage tanks 30a, 30b and hence to the outlet hoses 32 and 34. As previously mentioned, the transfer tanks, in combination with their associated valves, are essentially pneumatically powered positive displacement pump mechanisms.

Subsystem 16 configured for holding and transferring monopropellant has essentially the same valving/tubing arrangement as for each of the subsystems 12 and 14. Each subsystem 12, 14 and 16 includes its own flow control system comprised of various valves, leak detectors, gas pressure regulators, pressure transducers, and flow sensors and meters stationed in strategic locations in the routing tube system interconnecting the high pressure tank 44 to the propellant storage tanks 30a, 30b, 36, the transfer tanks 40a, 40b, and 42 and the outlet hoses 32, 36. The symbols for all these components of which the flow control system is comprised are defined above.

Thus, various storage tanks and routing tube system and pump mechanism, shown in the Figures provide a means for storing and routing fluid from the servicing spacecraft to associated storage tanks on the client satellite. The plurality of valves, leak detectors, pressure sensors, gas pressure regulators, temperature sensors flow sensors and meters interfaced with the computer control system and stationed in strategic locations in the routing tube system provide a means for controlling the flow of fluid (gas and/or liquids) during the transfer process.

The elements of each flow control system are interfaced with a command and control system for regulating or controlling parameters associated with fluid flow such as pressure and flow rates. The command and control system is described in more detail below and may include computer/processors mounted on the propellant transfer system. For saving mass preferably only one redundant computer is used to control all the subsystems but it will be understood that each subsystem could have its own computer controller.

As mentioned above, subsystems 12 and 14 each include two transfer tanks 40a (prime) and 40b (redundant) in flow communication with a pair of storage tanks 30a and 30b in any combination while subsystem 16 includes two transfer tanks 42a and 42b in flow communication with a single storage tank 36. This is solely to indicate that either a single or multiple storage tanks can be used as dictated by the servicer spacecraft configuration. Two or more storage tanks should be used if they are mounted off-axis so that they balance each other throughout the servicer spacecraft's lifetime whereas only one storage tank is necessary if it is on-axis. The storage tanks 30a and 30b are in flow communication with the high pressure section.

Figure 4:
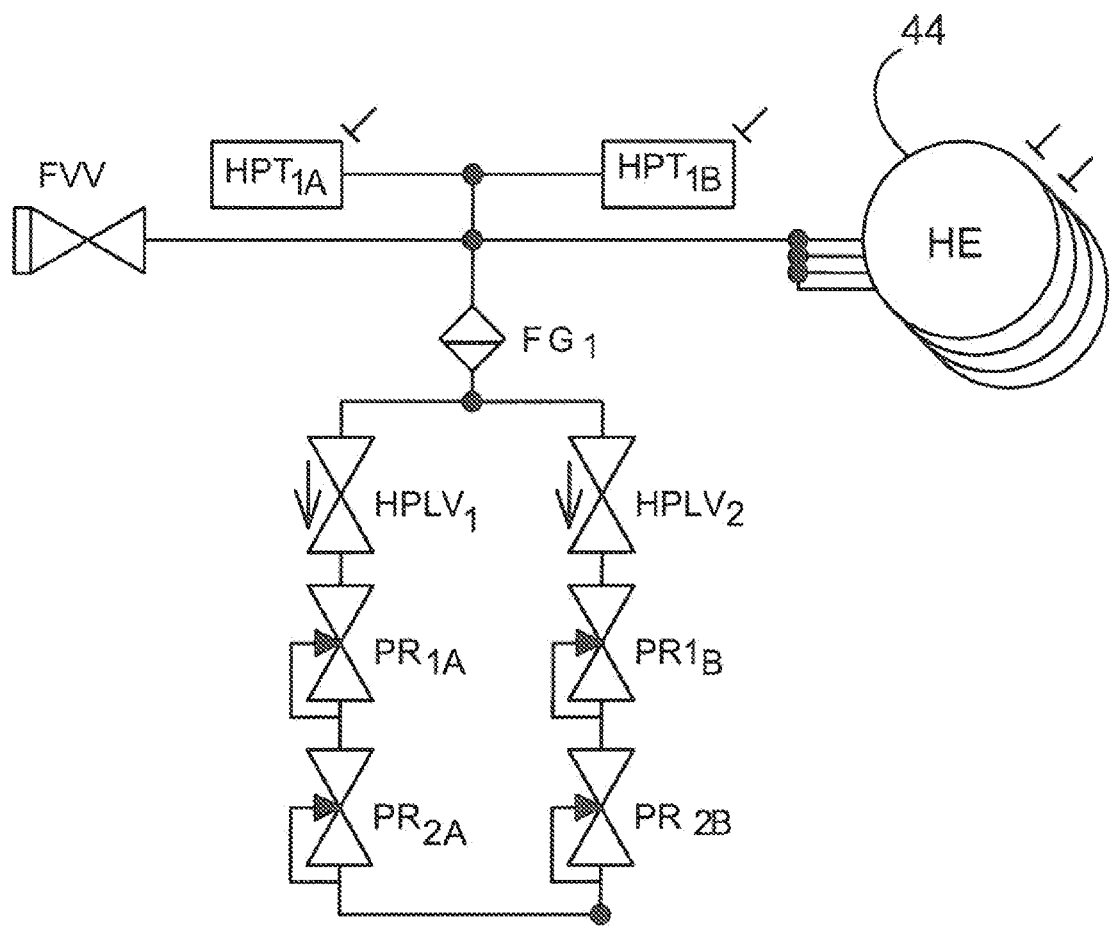
FIG. 4 is an enlarged view of the high pressure pressurant subsystem forming part of the present system.

FIG. 4 shows an enlarged view of the high pressure (up to about 300 bar) section of the propellant transfer subsystem of FIG. 1. Helium is stored in one or more pressurant tanks 44 (four are shown in FIGS. 1 to 5, with one clearly shown and three (3) partially hidden). Redundant HPLVs are used to isolate the downstream pressure regulators (PR) from the high pressure for launch. Quad redundant pressure regulators reduce the pressure and supply the rest of the refueling system with helium at lower pressure (about 20 bar).

Figure 5:
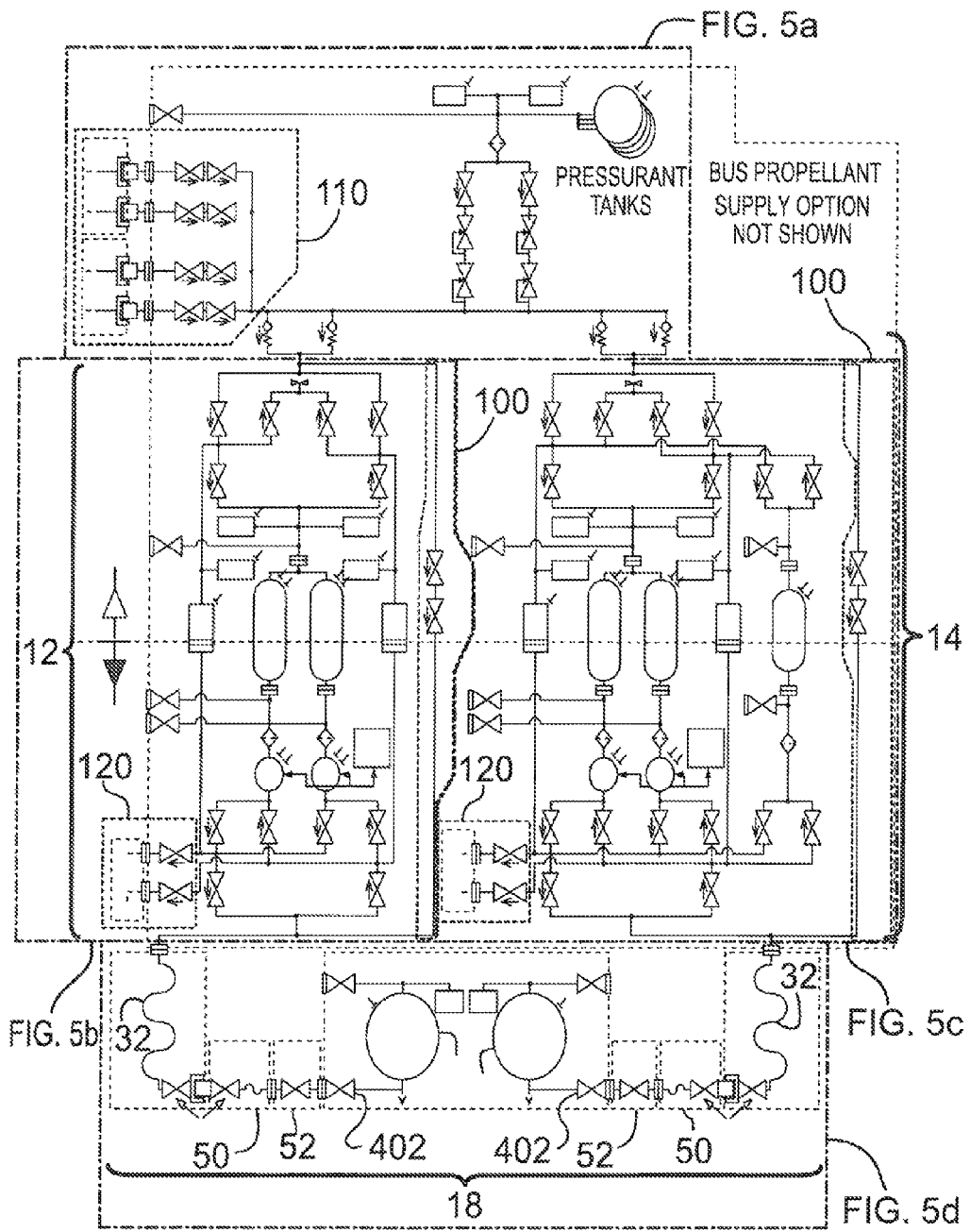
FIG. 5 shows a part of the block diagram of FIG. 1 but showing only the propellant transfer system for resupplying client satellites configured to use a bipropellant, including all redundant and optional subsystems.
Figure 5A:
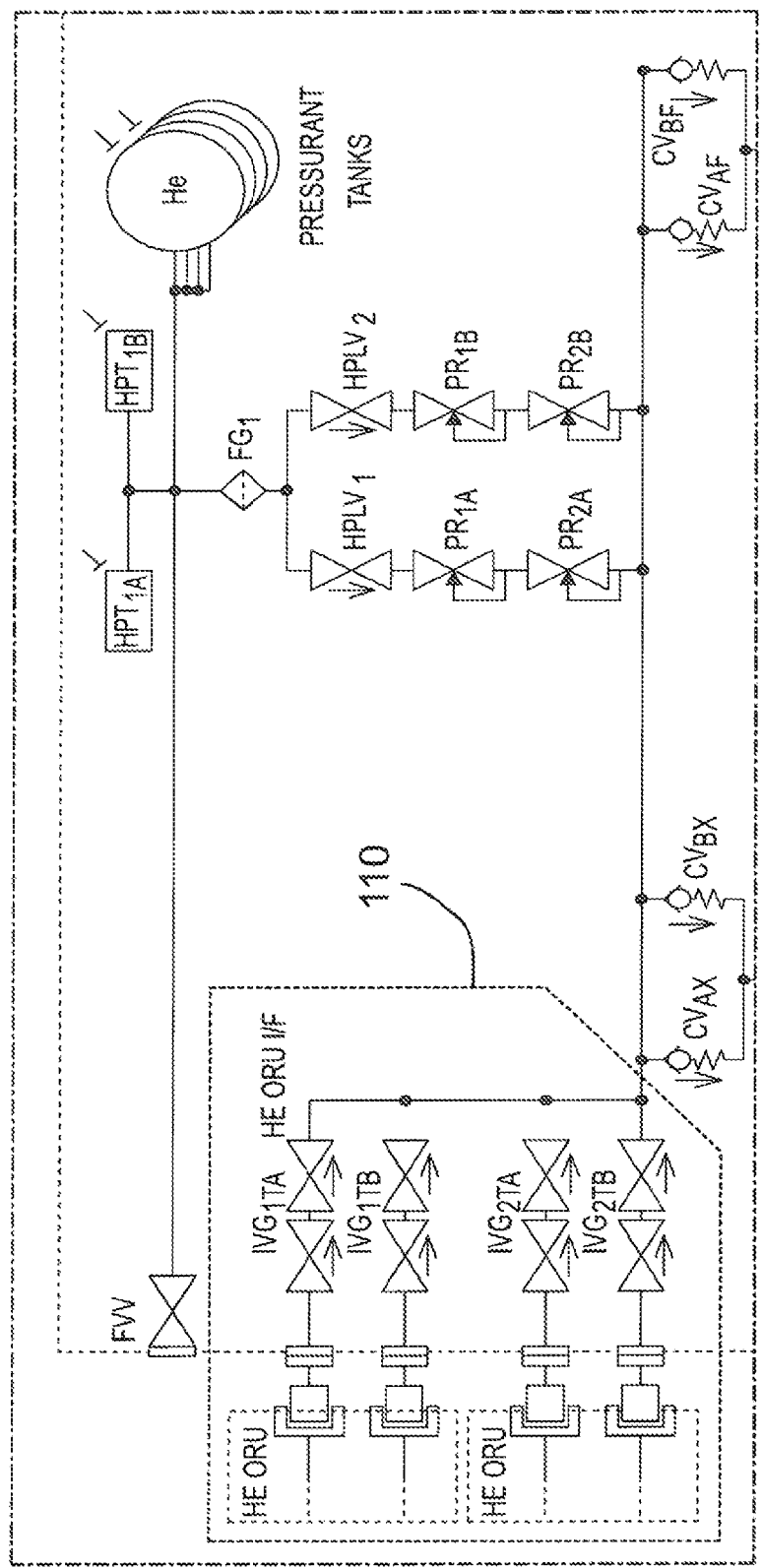
FIGS. 5a to 5d show expanded views of sections of the schematic of FIG. 5.
Figure 5B:
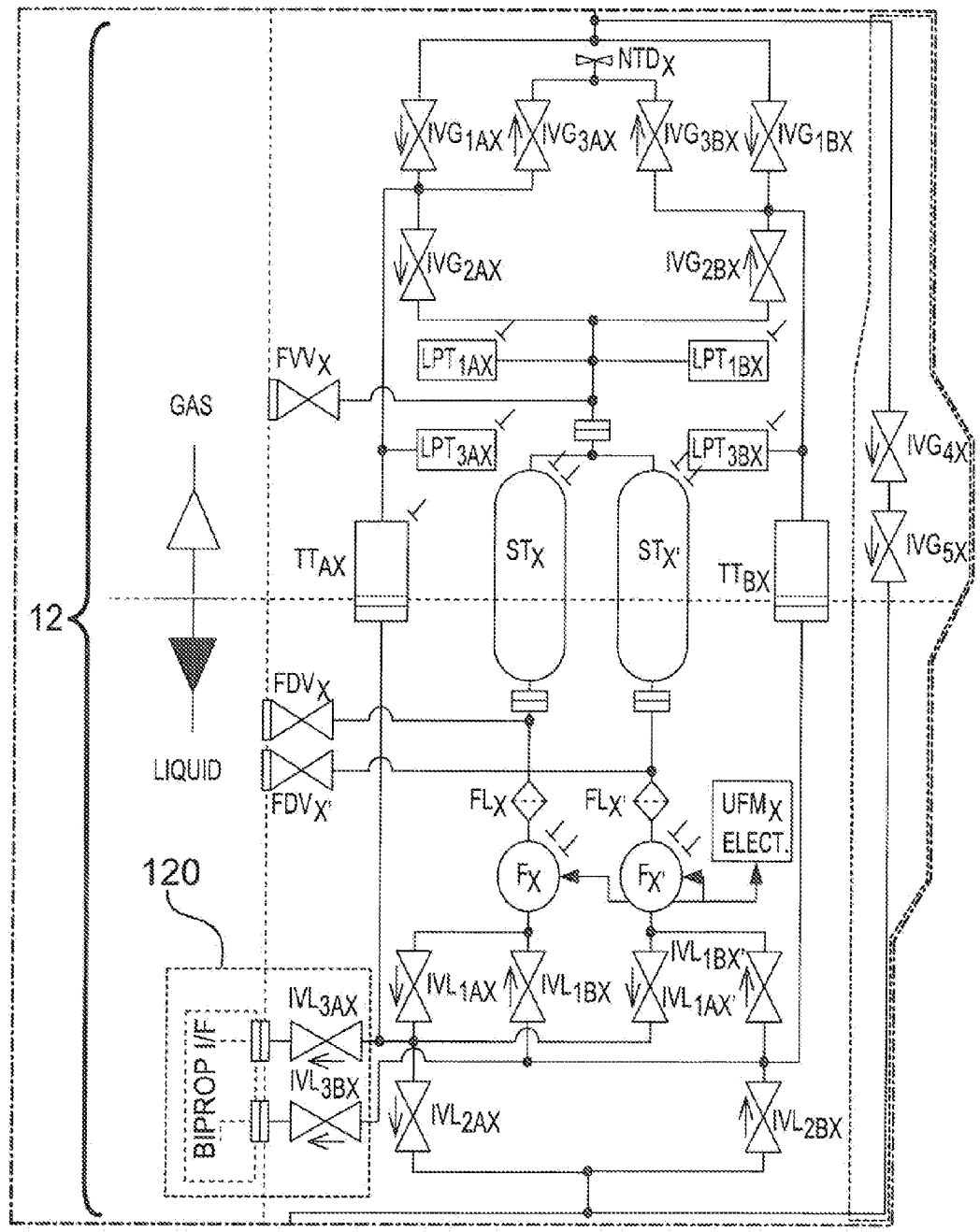
Figure 5C:
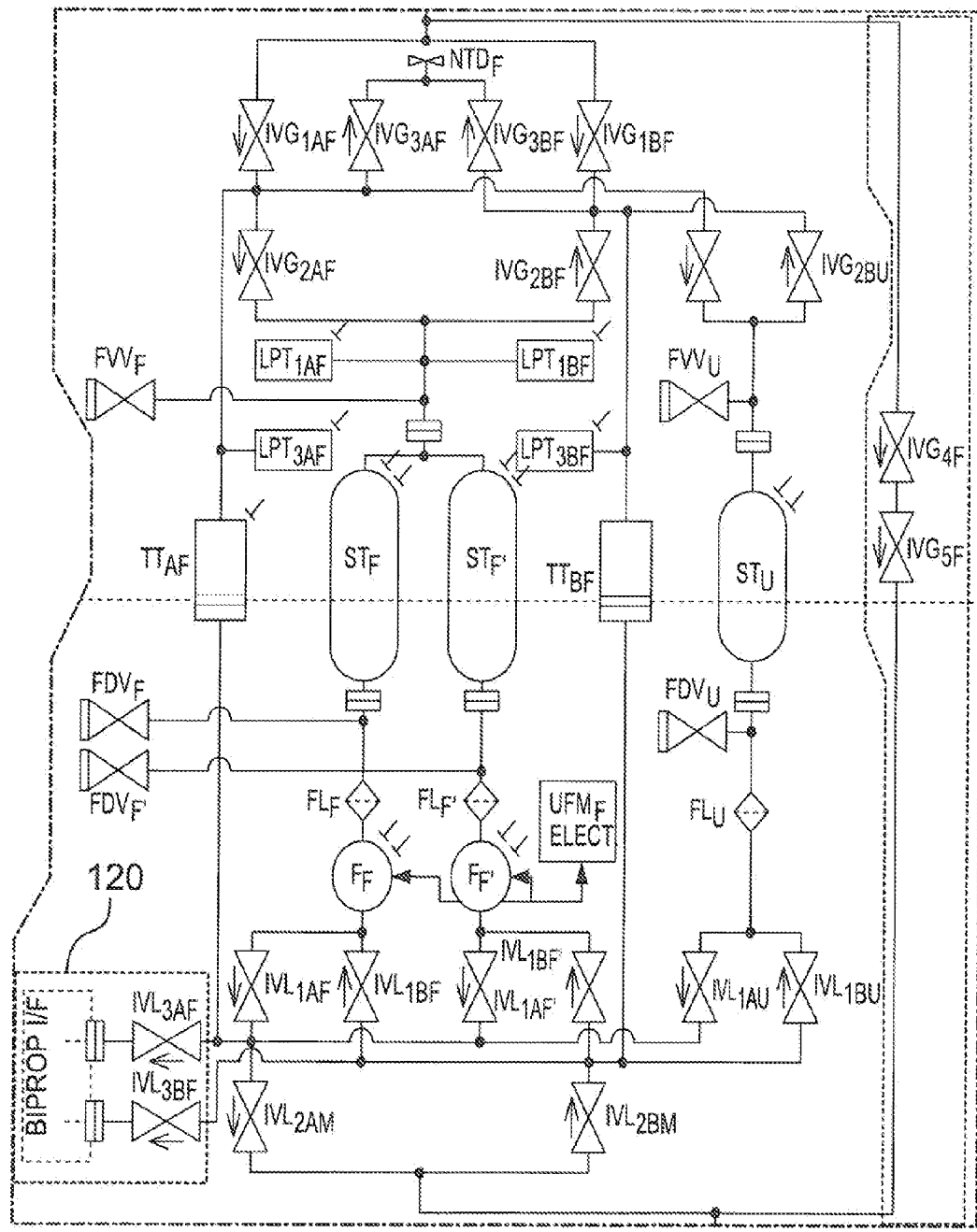
Figure 5D:
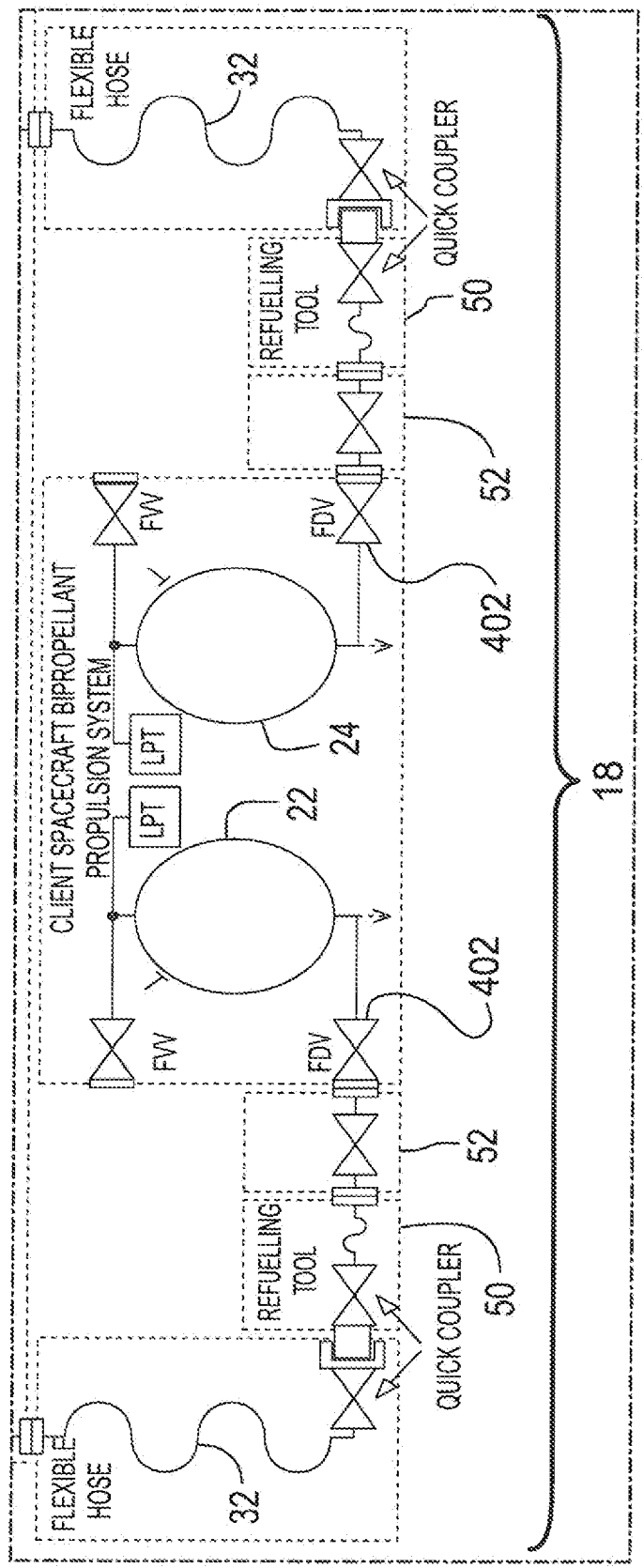

FIGS. 5 to 5d show the full propellant transfer system with optional subsystems (100, 106, 110, and 120 from FIGS. 2 to 2h) for the subsystems 12 and 14 for resupplying satellites with the bipropellant.

In all the propellant transfer subsystems, the gas flow rates are regulated by opening/closing on of the gas isolation valves (IVGs) based on pressure reading from one or more of the high pressure transducers (HPT) used to measure the pressure of the high pressure portion of the system and the low pressure transducers (LPT) used to measure the pressure at various parts of the in the propellant transfer subsystems separate from the high pressure section.

Propellant flow rate are regulated indirectly by controlling the gas pressure. However in some circumstances, in order to avoid wasting pressurant by venting it, it may not be preferable to decrease the flow rate this way. Thus, in some circumstances the flow rate may be regulated using only of the existing fluid valves. One way to control the propellant flow rate is to use the backup fill/drain valve 52 to regulate the flow rate. The backup fill/drain valve 52 opens partially depending on how far it actuator nut 132 (see FIG. 10) is rotated. Thus the flow rate in this preferred mode is controlled by adjustment of actuator nut 132, turning it slowly open until the flow rate reached the desired rate. Preferably backup fill/drain valve 52 has an adjustable orifice and is calibrated such that the command and control system can carefully adjust the orifice size depending on the calibration and a knowledge of the number of turns of actuator nut 132 performed by a refueling tool (discussed hereinafter) mated to the backup fill/drain valve 52.

Figure 6:
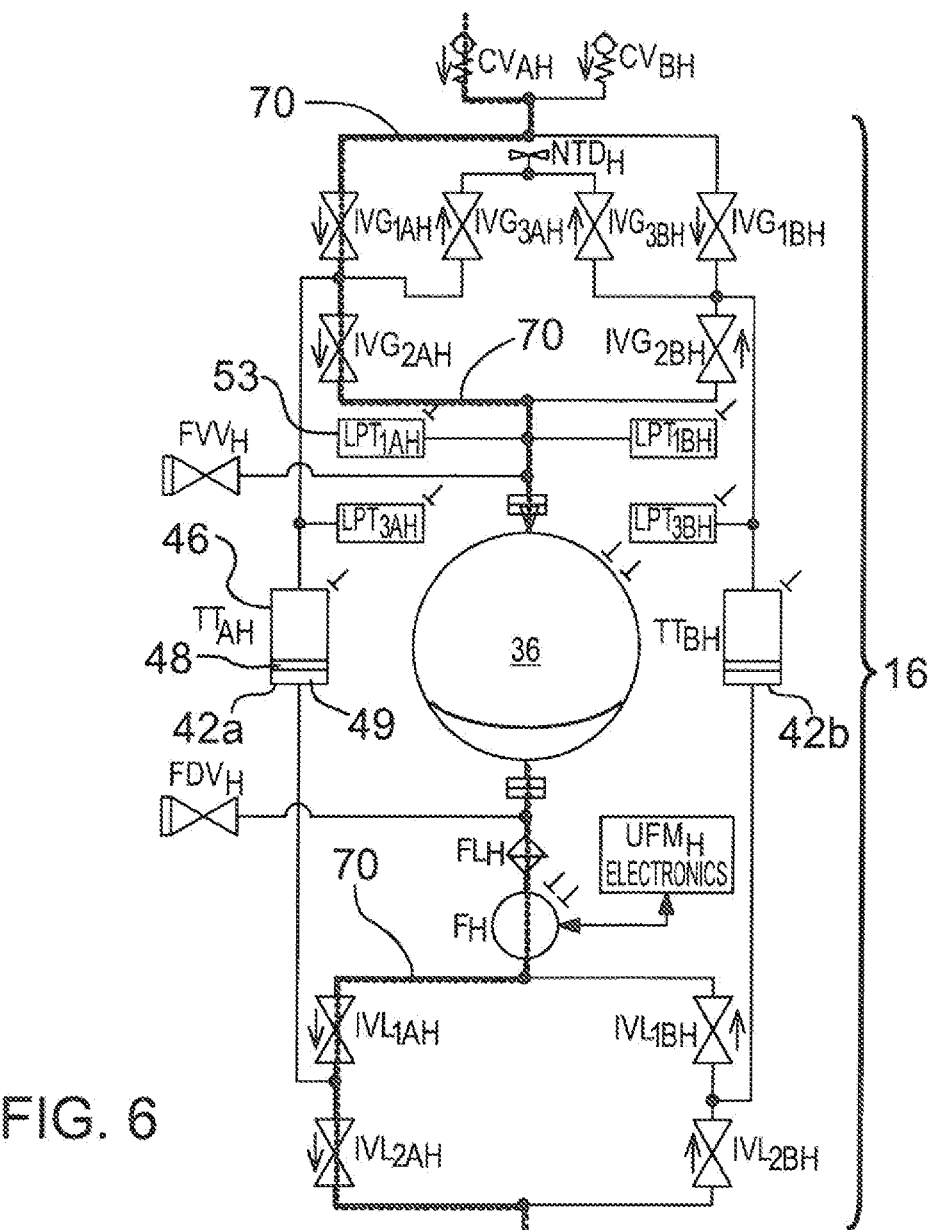
FIG. 6 shows a schematic drawing of a portion of the propellant transfer system configured for a first method of the propellant transfer process in which propellant is transferred directly by pressure gradient from a higher pressure propellant storage tank on the servicer spacecraft to a lower pressure client satellite propellant tank.
Figure 6:
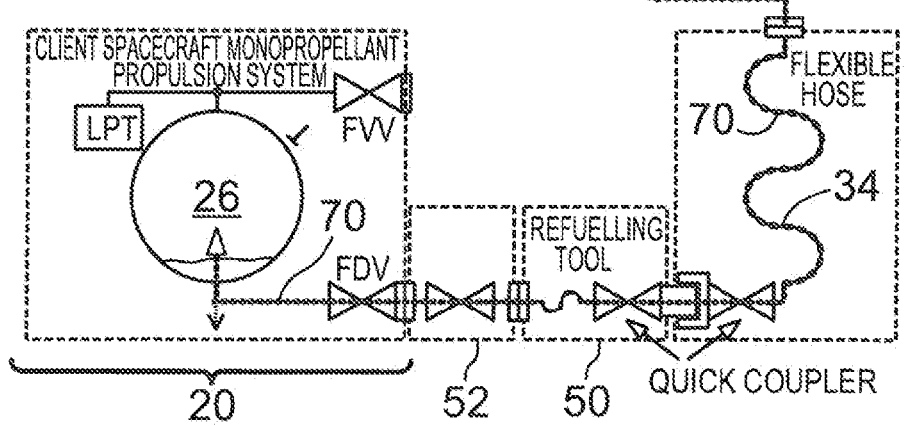

FIG. 6 shows an enlarged view of the monopropellant section of the propellant transfer subsystem of FIG. 1, and the dotted lines 70 from pressurant tank 44 (not shown in FIG. 6) down through storage tank 36 and down to exit hose 34 represents the propellant path for the delivered propellant using a first embodiment of a method of propellant transfer from the storage tank 36 to the client tank 26. In this first mode, the "direct transfer mode", the propellant transfer system is configured to provide regulated transfer of the propellant directly from storage tank 36 due to a simple pressure gradient from the storage tank which is indicated by the broken line 70 from the storage tank 36 to the outlet which is connected via the flow meter transducer, $IVL_1$, $IVL_2$, the flex hose, the backup fill/drain valve, and the refueling tool to the associated propellant line of the client satellite (the monopropellant line on the client satellite if it is the monopropellant that is being transferred, the fuel line if it is the fuel being transferred, or the oxidizer line if it is the oxidizer being transferred). This is the preferred mode of operation where the client satellite propellant tank 26 is at a pressure below that of the servicer spacecraft's propellant storage tank 36. The pressure of client satellite storage tank 26 (between about 5 bar and 20 bar) depends on the client satellite's thrusters operating pressure range and its state of life. The maximum storage tank operating pressure (up to about 30 bar) depends on the tank design. In this embodiment the "pump mechanism" is the pressurized storage tank 44 itself and associated valves etc.

As fluid propellant flows from the servicer's storage tank 36, pressurant gas He in the storage tank expands into the volume vacated by the propellant, thereby reducing the storage tank 36 pressure. The storage tank 36 can be pressurized, or its pressure maintained, by allowing pressurant gas to flow as indicated by the broken arrow 70 from the high pressure tank 44 to the storage tank via the valves IVG1 and IVG2.

As propellant flows into the client propellant tank 26, the propellant displaces the gas inside the tank 26 thereby compressing it. This reverses the reduction of pressure in the client propellant tank 26 over its life due to pressurant gas expansion as propellant is expended for orbit maintenance. In this way, the conditions of the client satellite return to an earlier state both in terms of the quantity of propellant and pressure in its tank 26.

Figure 7A:
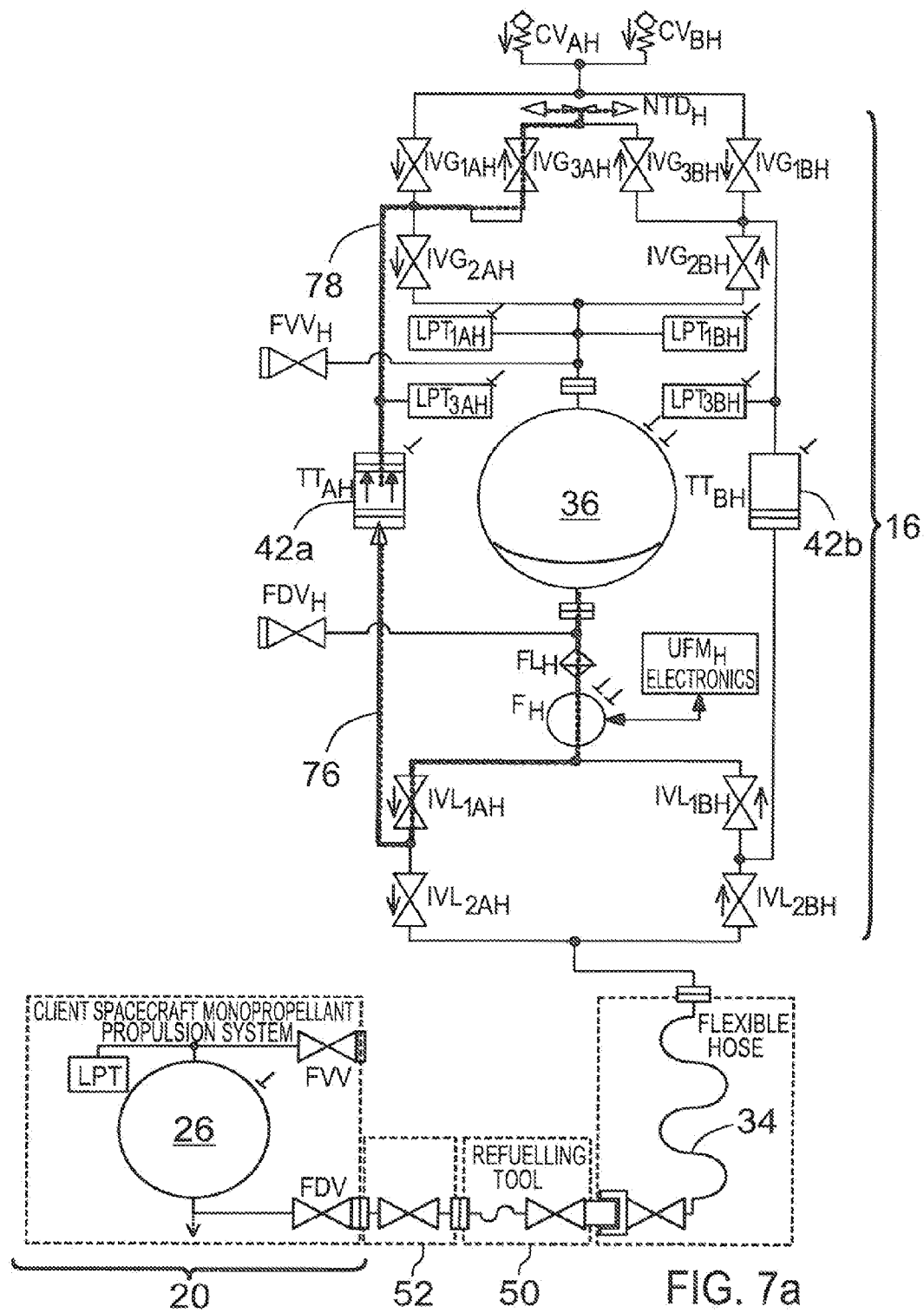
FIGS. 7a and 7b shows schematic drawing of a portion of the system configured for a second method of the propellant transfer process in which propellant is first cycled from the propellant storage tank to the transfer tank (FIG. 7a) and then from the transfer tank to the client satellite propellant tank (FIG. 7b).
Figure 7B:
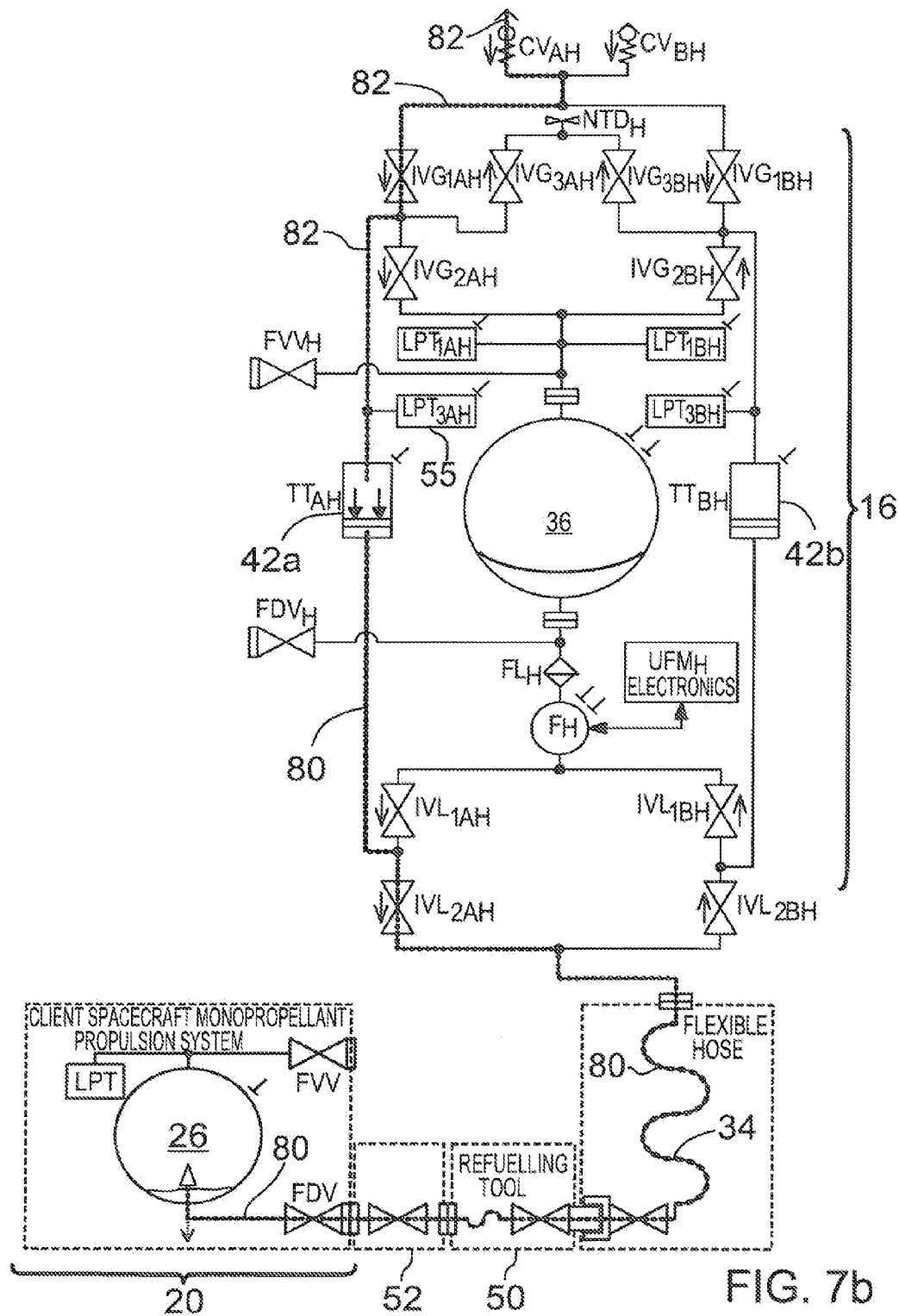

FIGS. 7a and 7b show a second mode of operation such that the method of transferring propellant from storage tank 36 to client storage tank 26 using a "pumped transfer via transfer tank/pump" mode. In this mode of operation the propellant transfer system is configured to first transfer the propellant using the first half of a (pumping) cycled transfer of propellant from the storage tank 36 to the transfer tank 42a. Referring to FIG. 7a, the propellant transfer system fills the transfer tank 42a with a desired amount of propellant from storage tank 36 as shown by the broken arrow 76. The propellant is pushed by a pressure gradient induced by venting pressurant from the gas volume 46 (separated and isolated from the fluid volume 48 by diaphragm or piston 49) of the transfer tank 42a to space as shown by the broken arrow 78.

Referring to FIG. 7b, the propellant is then transferred to the client tank 26 using a pressure gradient induced by pressurizing the transfer tank 40a from the high pressure He tank 44 (not shown) along the piping path indicated by arrow 82 such that the fluid in transfer tank 42a is driven into storage tank 26 on the client satellite as shown by the broken arrow 80. This is the only possible mode of operation where the client satellite propellant tank 26 is at a pressure greater than that of the servicer propellant storage tank up to the set point for the pressure regulators in the high pressure section.

Referring to FIG. 3, it is noted that the combination of the transfer(s) tank 40a (40b) or 42a (42b) and the five valves IVG1, IVG2, IVG3, IVL1, and IVL2 act as a pump when operated in a coordinated way. When operated in other (differently coordinated) ways these components perform other functions. Examples of these other functions include the capability to relieve the pressure in the hoses 32 and 34 to facilitate disconnection of the refueling tool 50 from the client satellite fill/drain valve 402 and metering of propellant by counting transfer cycles. Such metering can be used to verify performance of the flow meter with or without actual transfer of propellant to a client satellite.

It will be appreciated that while the propellant transfer system is primarily configured for resupply of propellant to a client satellite, it may be used for the reverse process. For example it may be used to resupply of propellants to the servicer spacecraft by venting the storage tank(s) 36, and then letting the (reverse) pressure gradient push the propellant from a purpose built tanker spacecraft or from the client satellite storage tank 26 to the servicer's propellant storage tanks 36. Such an operation would be conducted if the client satellite is no longer viable for its intended purpose but remains a useful source of propellant. This applies equally to both the direct transfer method (FIG. 6) and the cycled transfer method (FIGS. 7a and 7b).

For either method of transfer the propellant flow rate is measured using one or more flow meters integrated into the tube system. Any type of flow meter may be used, for example, but not limited to, ultrasonic flow meters. The flow rate may be numerically integrated over time by an onboard computer to determine the quantity of propellant transferred. For the 'pumped' transfer via the transfer tank/pump 42a, the quantity of propellant transferred can also be determined based on the known transfer tank volume and by simply counting the number of transfer cycles. This can be also be used as a back-up means of propellant metering. Performing the first half cycle filling of the transfer tank can be used periodically (i.e., at the beginning of direct transfer operations for refueling each client) to check the performance of the flow meter.

Once the desired quantity of propellant is transferred by either of the above transfer methods, then the transfer tank pressurant can be vented to space (by opening $IVG_3$) and then the flex hose pressure relieved (by opening $IVL_2$) in order to facilitate disconnection of the refueling tool from the client satellite FDV.

It is noted that the two (2) methods of transferring fluids from the server spacecraft storage tank to the client satellite being refueled have been described with reference to the monopropellant subsystem 16. However, it will be appreciated that the same two methods will be employed, depending on the circumstances, for the propellant transfer subsystems 12 and 14 for transferring the bipropellant.

Given the financial value of transporting the propellant into space, it is highly preferred that the amount of propellant being provided to each client spacecraft is measured accurately to demonstrate that the customer has received the full amount of propellant being purchased. To ensure this, two features are incorporated into the present design, first, the system is configured to provide highly regulated flow of propellant from the servicer spacecraft to the client satellite which is facilitated by flow meters installed in the flow paths through the piping system to the client storage tank.

Secondly, leak detection throughout the flow path is enabled through the monitoring of pressure changes over periods of time where the pressure would only change due to the presence of a leak (i.e., leak detection period before and after refueling). These monitoring periods may include periods of time both before and after opening the backup fill/drain valve 52 once it has been mated to the client satellite fill/drain valve 402, before and after opening the client fill/drain valve, and before and after closing the client satellite fill/drain valve after transferring propellant to the client satellite, and after closing the backup fill/drain valve following closure of the client fill/drain valve.

Each of the valves of the propellant transfer system that must be opened or closed prior to, during, and after, propellant transfer (e.g. FVV, HPLV, HPT, IVG, IVL, NTD, and PR) are actuated by drive circuits that are interfaced with the above-mentioned command and control system which is discussed in more detail hereinafter.

A feature of the present invention is the flow control systems capability to detect the pressure in client propellant tanks 24 and 26 once the client fill/drain valve 402 has been opened. Thus, if the client satellite propellant tank 26 is at a pressure greater than that of the servicer propellant storage tank up to the as the set point for the pressure regulators in the high pressure section, then the computer is programmed to use the method illustrated in FIGS. 7a and 7b to provide regulated gas and propellant flow rates. On the other hand, if the client satellite propellant tank 26 is at a pressure below that of the servicer spacecraft's propellant storage tank 36 then the computer is programmed to use the method illustrated in FIG. 6 using the back-up FDV to regulate the flow rate as appropriate.

As noted above, since the transfer tanks 40a and 42a, in combination with their associated valves, are essentially a pneumatically powered positive displacement pumps, and may be replaced by some other form of pump such as a motor-driven piston pump, gear pump, or diaphragm pump.

Thus, the present system is designed to have the ability to dynamically regulate the flow rates of gas and propellant based on feedback from the flow meter, giving the present system a significant advantage and obviating the need to physically modify the client satellite.

The present propellant transfer system can be used to transfer propellant anywhere, say to a second depot in orbit or on the moon, as well as satellites needing to be refueled in addition to the system being used to remove propellant from dead satellites as mentioned previously.

Figure 13:
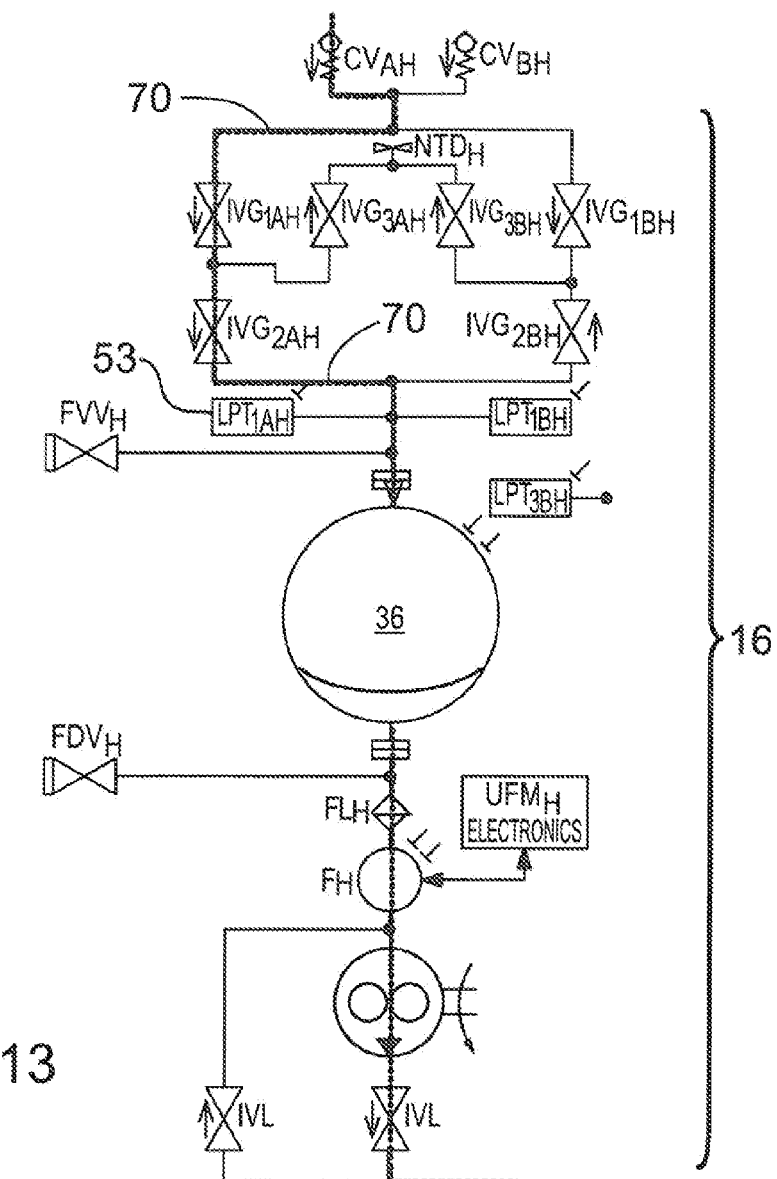
FIGS. 13 and 13a shows an alternative embodiment of a fluid transfer system using a mechanical pump.
Figure 13:
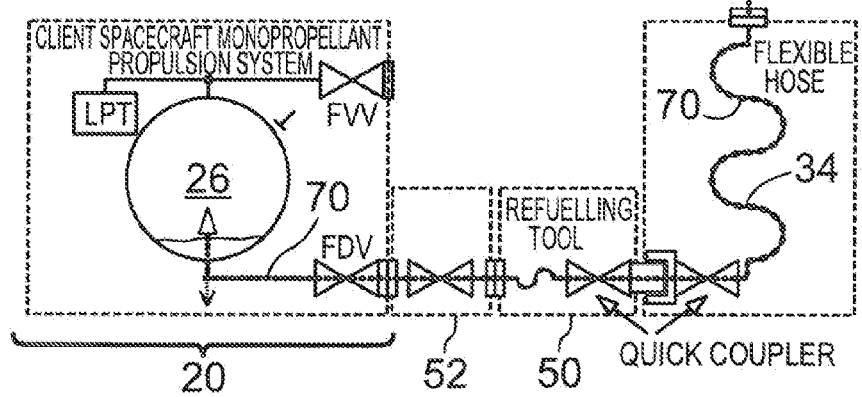
Figure 13A:
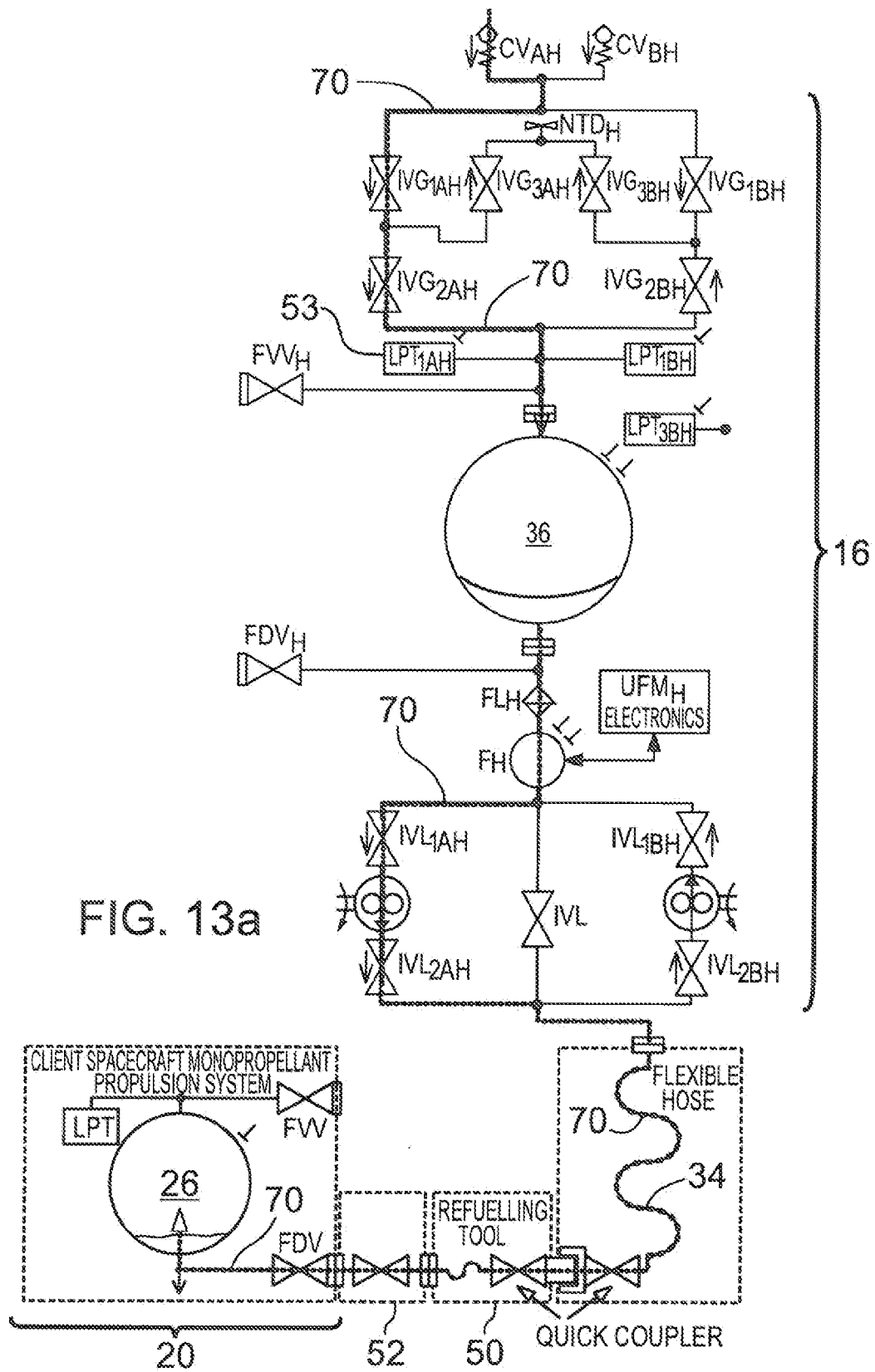

FIGS. 13 and 13a shows an alternative embodiment of a fluid transfer system using a mechanical pump. FIG. 13 shows the basic concept of using an inline pump which in an embodiment is realized by modifying the system of FIG. 6 to replace some of the "refill and transfer" plumbing and replace it with inline pump 400. FIG. 13a shows an embodiment using redundant pumps 400 located in the parallel flow paths with isolation valves so that only one pump 400 is active at one time. Only one isolation valve required to isolate a redundant string, but the Figure shows both entrance/exits of the pumps isolated so that fluid can be excluded from the redundant pump cavities as needed.

It is noted that all embodiments of the fluid transfer system include the pressurized gas tank with the inert gas. For the embodiments of the system without the inline pump, the pressurized as fulfills two roles, the first to provide the motive force for moving the propellants from the servicer satellite to the client satellite, it also and secondly it replaces the volume that is voided in the servicer satellite storage tank(s). In the case of the embodiments in FIGS. 13 and 13a that uses a mechanical pump as the motive force, the pressurized gas is still used to replace the volume that is voided from the servicer storage tank(s). Thus while both embodiments use the pressurized gas, the system of FIGS. 13 and 13a uses a lesser amount.

Figure 8:
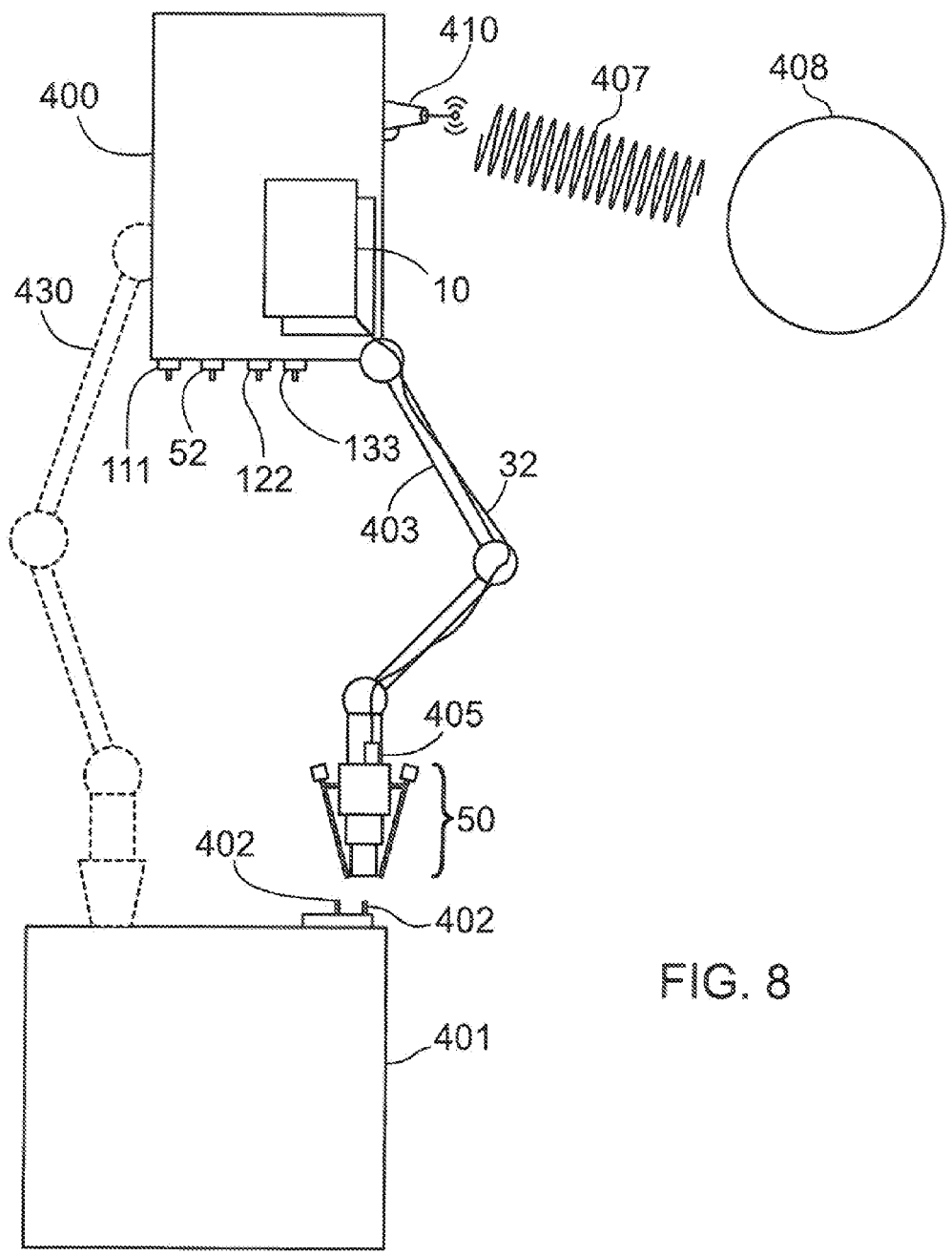
FIG. 8 shows the refueling system mounted on a servicer spacecraft with a computer control system in communication with a remote teleoperation control center.

The propellant transfer system disclosed herein may form part of a satellite refueling system which may include a dedicated servicer spacecraft on which the propellant transfer apparatus, including a tool caddy, robotic arm and various tools, are mounted. FIG. 8 is a block diagram showing those items pertaining to the refueling of a satellite in addition to the refueling system. These include a host servicer spacecraft 400, the client satellite 401 to be refueled, the client valve(s) 402, a robotic arm 403, the refueling tool 50 releasibly gripped by the end effector of robotic arm 403, a propellant coupling mechanism 405, the propellant outlet hose 32, the propellant transfer system 10, and a communication system 410 to provide a two-way radio link 407 to Earth 408. It also shows the stowage points for the backup fill/drain valve 52, the replacement seal fitting 133, the secondary seal fitting 122 and the reset post 111.

Such a dedicated servicer spacecraft may include a spacecraft docking mechanism such as that disclosed in U.S. Pat. No. 6,969,030 issued Nov. 29, 2005, which patent is incorporated herein in its entirety by reference.

The satellite refueling system includes a multifunction tool as disclosed in co-pending U.S. patent application Ser. No. 13/652,339 filed Oct. 15, 2012, to Roberts et al. (United States Patent Publication 2013/_____) (which is incorporated herein in its entirety by reference) the purpose of which is to provide tool tips needed to gain access to the fill/drain valves 402 themselves and includes a tool holder and a suite of tool tips which are held by the tool holder and activated by a single motive source under robotic control. The multifunction tool is releasibly graspable by the end effector of the robotic arm 403.

The refueling tool 50 for accessing the fill/drain valves 402 on the client satellite to allow for the transfer of bi- or monopropellants from the servicer spacecraft to the client satellite may be the same as that disclosed in co-pending U.S. patent application Ser. No. 61/566,893, filed as a full utility application Ser. No. _____ filed Dec. 5, 2012 (United States Patent Publication _____) (which is incorporated herein in its entirety by reference).

The command and control system is configured to control movement of the robotic arm 403 and the end effector attached thereto for controlling the action of the multifunction tool, as well as the refueling tool 50. This may be the same command and control system mentioned above that is interfaced with the flow control system, for example a computer mounted on the servicer satellite which is programmed with instructions to carry out all operations needed to be performed by the servicer satellite during approach, capture/docking with the client satellite and refueling operations. It may also be a separate computer system. The satellite refueling system includes a vision system for viewing the operation of the multifunction tool and the refueling tool during propellant transfer operations. Communication system 410 is interfaced with the robotic arm 403 and configured to allow remote operation (from the Earth 408 or from any other suitable location) of the vision system (which may include one or more cameras), the robotic arm 403 and hence the tools. The vision system may include distinct markers mounted on the fluid transfer coupling used to couple the fluid transfer system storage tank and piping system to the fill/drain valve of the client satellite, as well as markings on all tools associated with the fluid transfer operation.

These cameras may be used within a telerobotic control mode where an operator controlling the servicing robotics on earth views distinct views of the worksite on display screens at the command and control console. In an alternative mode, the position of elements like the fill drain valve may be determined by either a stereo camera and vision system which extracts 3D points and determines position and orientation of the fill-drain valve or other relevant features on the worksite from which the robotic arm holding tools (multi-function tool, refueling tool) can be driven to these locations according the sensed 6 degree-of-freedom coordinates.

The stereo camera could also be replaced with a scanning or flash lidar system from which desired 6 degree-of-freedom coordinates could be obtained by taking measured 3-D point clouds and estimating the pose of desired objects based on stored CAD models of the desired features or shapes on the refueling worksite. For those applications where the spacecraft was designed with the intention to be serviced, a simple target such as described in Ogilvie et al. (Ogilvie, A., Justin Allport, Michael Hannah, John Lymer, "Autonomous Satellite Servicing Using the Orbital Express Demonstration Manipulator System," Proc. of the 9th International Symposium on Artificial Intelligence, Robotics and Automation in Space (i-SAIRAS '08), Los Angeles, Calif., Feb. 25-29, 2008) could be used in combination with a monocular camera on the servicing robotics to locations items of interest such as the fill-drain valve. Finally, the robotic arm or device used to position the device may include a sensor or sensors capable of measuring reaction forces between the tools and the work-site (e.g. fill-drain valves). These can be displayed to the operator to aid the operator in tele-operation control or can be used in an automatic force-moment accommodation control mode, which either aids a tele-operator or can be used in a supervised autonomous control mode.

A system of this type is very advantageous particularly for space-based systems needing remote control. The various components making up the refueling system may be retrofitted onto any suitable satellite to be used as a servicer spacecraft for 400 refueling. The servicer spacecraft with the propellant transfer apparatus mounted thereon could be carried on a larger "mother ship" and launched from there or stored on an orbiting space station and launched from there when needed.

The system may be operated under tele-operation by a remotely located operator, for example located on earth, in the "mother ship", or in an orbiting space station. Under pure remote teleoperator control, command and control is by the teleoperator who may issue commands directly to the propellant transfer system to open and close selected fluid and gas valves based on the known client pressure and feedback from the flow meter.

Figure 12:
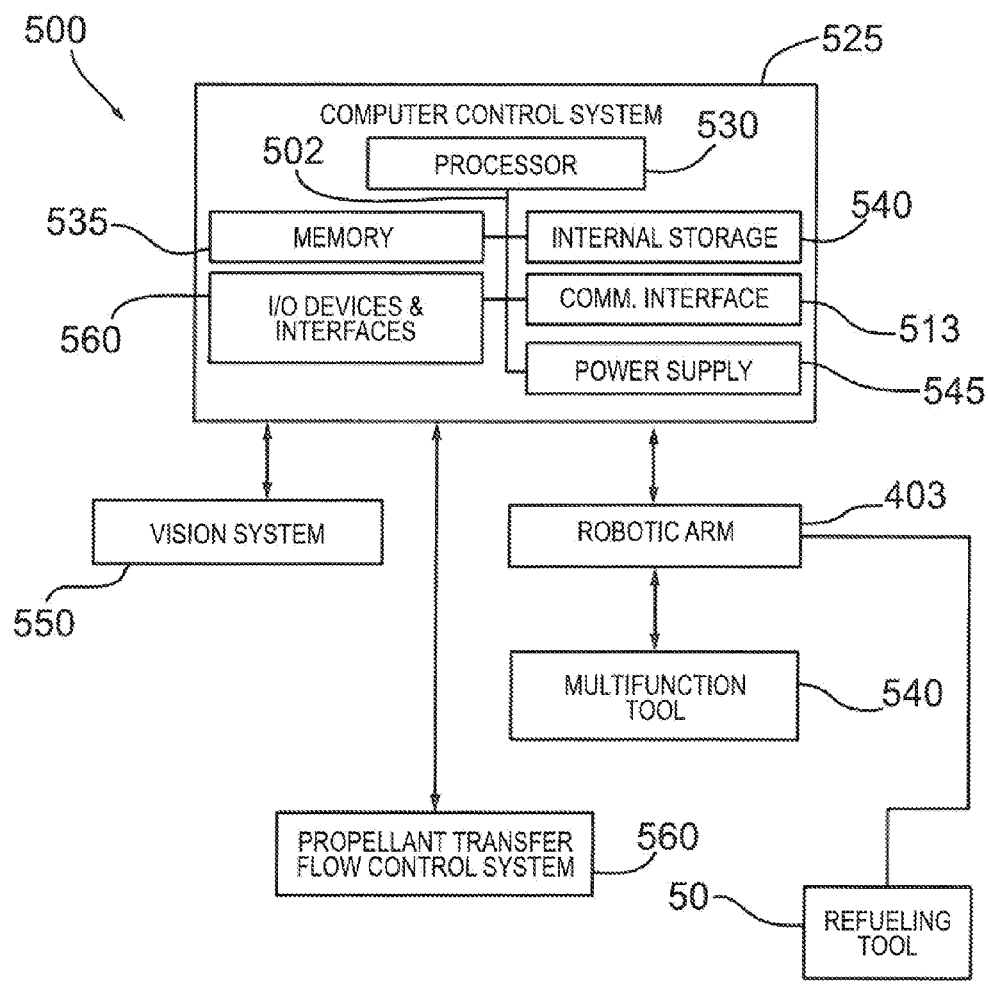
FIG. 12 shows an exemplary, non-limiting computer control system forming part of the system disclosed herein.

In addition, the servicer satellite 400 (FIG. 8) includes an onboard computer control system 500 which may be interfaced with the propellant flow control system, shown at 560 in FIG. 12 so that it can drive all the components that are opened and closed during the propellant transfer operations in a selected sequence depending on which mode of propellant transfer has been selected based on the pressure in client tank 26. With the presence of the computer control system 500 interfaced with the propellant flow control system, the propellant transfer process may be autonomously controlled by a local Mission Manager or may include some levels of supervised autonomy so that in addition to being under pure tele-operation there may be mixed teleoperation/supervised autonomy.

The present system is also configured for full autonomous operation. A fully autonomous system is a system that measures and responds to its external environment; full autonomy is often pursued under conditions that require very responsive changes in system state to external conditions or for conditions that require rapid decision making for controlling hazardous situations. The implementation of full autonomy is often costly and is often unable to handle unforeseen or highly uncertain environments. Supervised autonomy, with human operators able to initiate autonomous states in a system, provides the benefits of a responsive autonomous local controller, with the flexibility provided by human tele-operators.

The method of resupplying propellant to a client satellite comprises the following steps. First, servicer spacecraft 400 is maneuvered into position and orientation with respect to client satellite 401 under a) computer control, based on sensor feedback from onboard sensors having outputs interfaced with the onboard computer system on the servicer spacecraft, or under b) teleoperator control by an operator remotely located from the servicer spacecraft, or c) under combined computer and teleoperator control.

Once the servicer spacecraft 400 and the client satellite 401 are in the desired relative position and orientation, servicer spacecraft 400 releasibly captures client satellite 401. The capture process may involve direct capture by for example and satellite capture device such as that disclosed in U.S. Pat. No. 6,969,030 issued Nov. 29 2005, which patent is incorporated herein in its entirety by reference. Alternatively, the client satellite 401 may be realisibly captured by a dedicated robotic arm 430 (shown in dashed outline in FIG. 8). Or, a combination capture process may include use of both a robotic arm 430 and the mechanism shown U.S. Pat. No. 6,969,030.

After capture is complete, robotic arm 403 is deployed to releasibly grasp a multifunction tool 440, such as disclosed in co-pending U.S. patent application Ser. No. 61/546,770 filed Oct. 12, 2011, to Roberts et al. (United States Patent Publication 2013/_____), whereupon robotic arm 403 is commanded to use tool 440 (see FIG. 12) to gain access to the propellant tank valves 402 on client satellite 401 by cutting through any thermal blankets and lock wires on the propellant valve(s) 402. Once this is complete, multifunction tool 440 is released and sequestered onto its tool holder by the end effector on the servicer spacecraft 400 and the refueling tool 50 is releasibly gripped by the end effector of robotic arm 403. The refueling tool 50 is then commanded to releasibly grasp backup fill/drain valve 52 from its holder on satellite 400 and is mated with client satellite propellant tank fill/drain valve 402.

Figure 9:
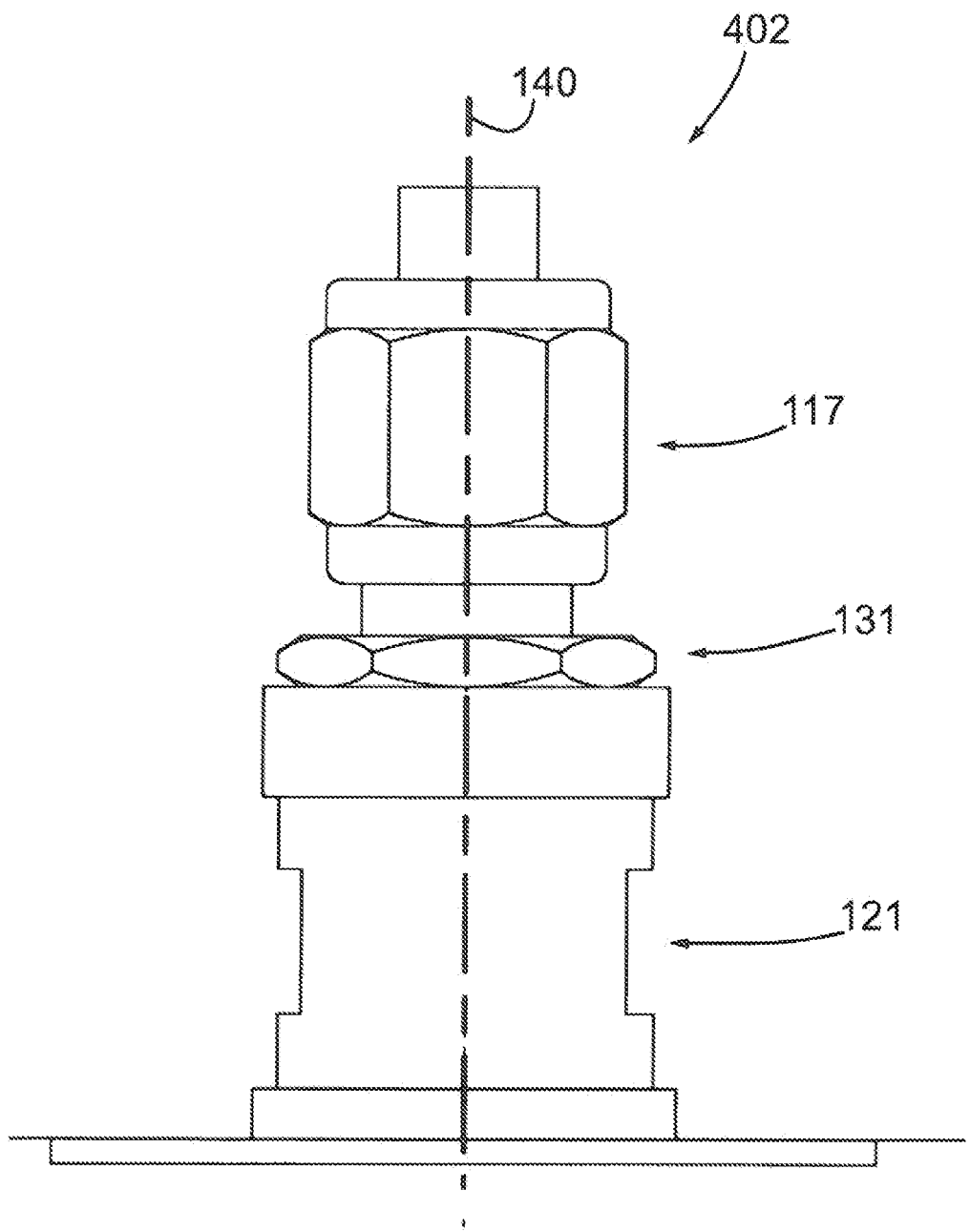
FIG. 9 shows a drain/fill valve located on a client satellite to be resupplied with propellant.

FIG. 9 shows the client satellite drain/fill valve 402, the secondary seal fitting 117, the valve actuation nut 131, the torque reaction features 121 and the client valve centreline 140. FIG. 10A shows the backup fill/drain valve 52 with the secondary seal threaded feature 127, the backup fill/drain valve actuation nut 132, the backup fill/drain valve torque reaction feature 129 and the backup fill/drain valve seal fitting 128.

Figure 10B:
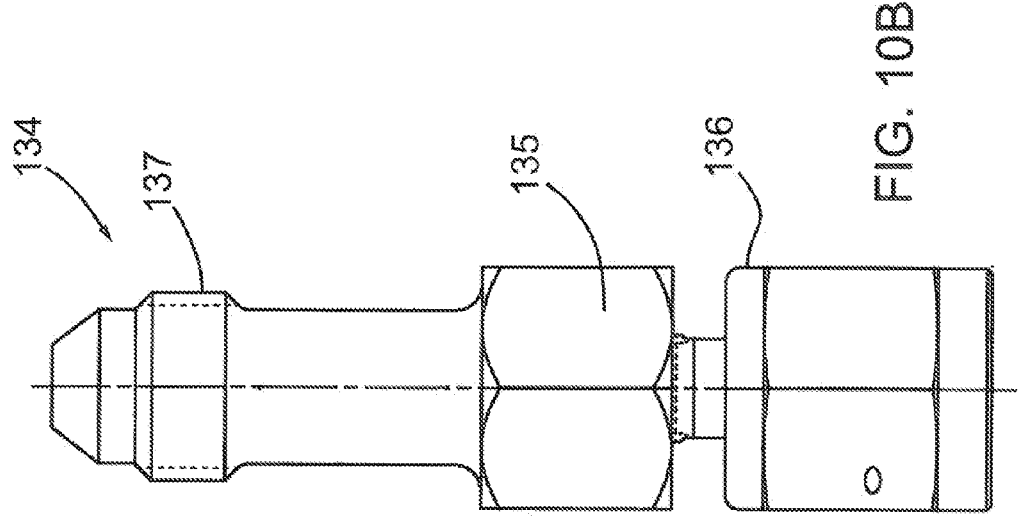
FIG. 10b is an elevation view of a replacement secondary seal fitting used to close off the fill/drain valve of the propulsion system on the client satellite once propellant transfer operations have been completed.
Figure 10A:
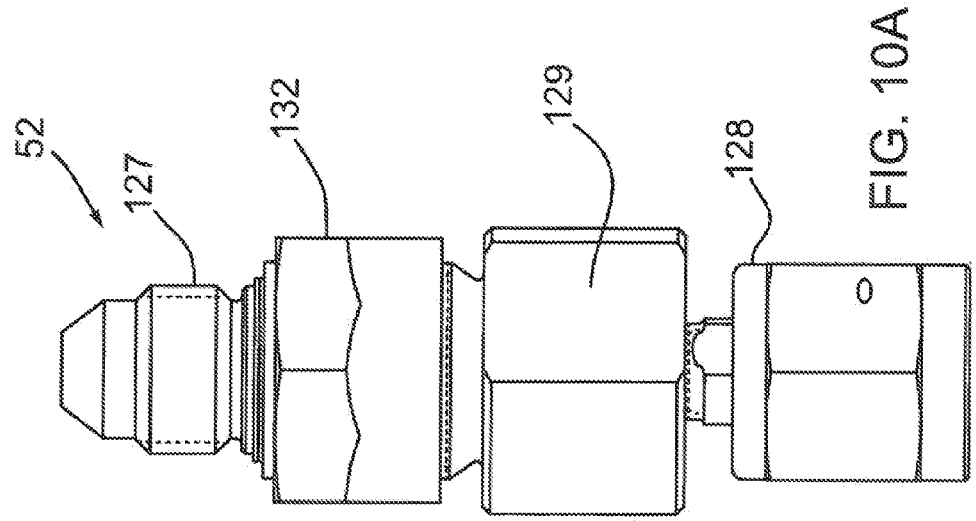
FIG. 10a shows the backup fill/drain valve with the secondary seal threaded feature, the backup fill/drain valve actuation nut, the backup fill/drain valve torque reaction feature and the backup fill/drain valve seal fitting.
Figure 11:
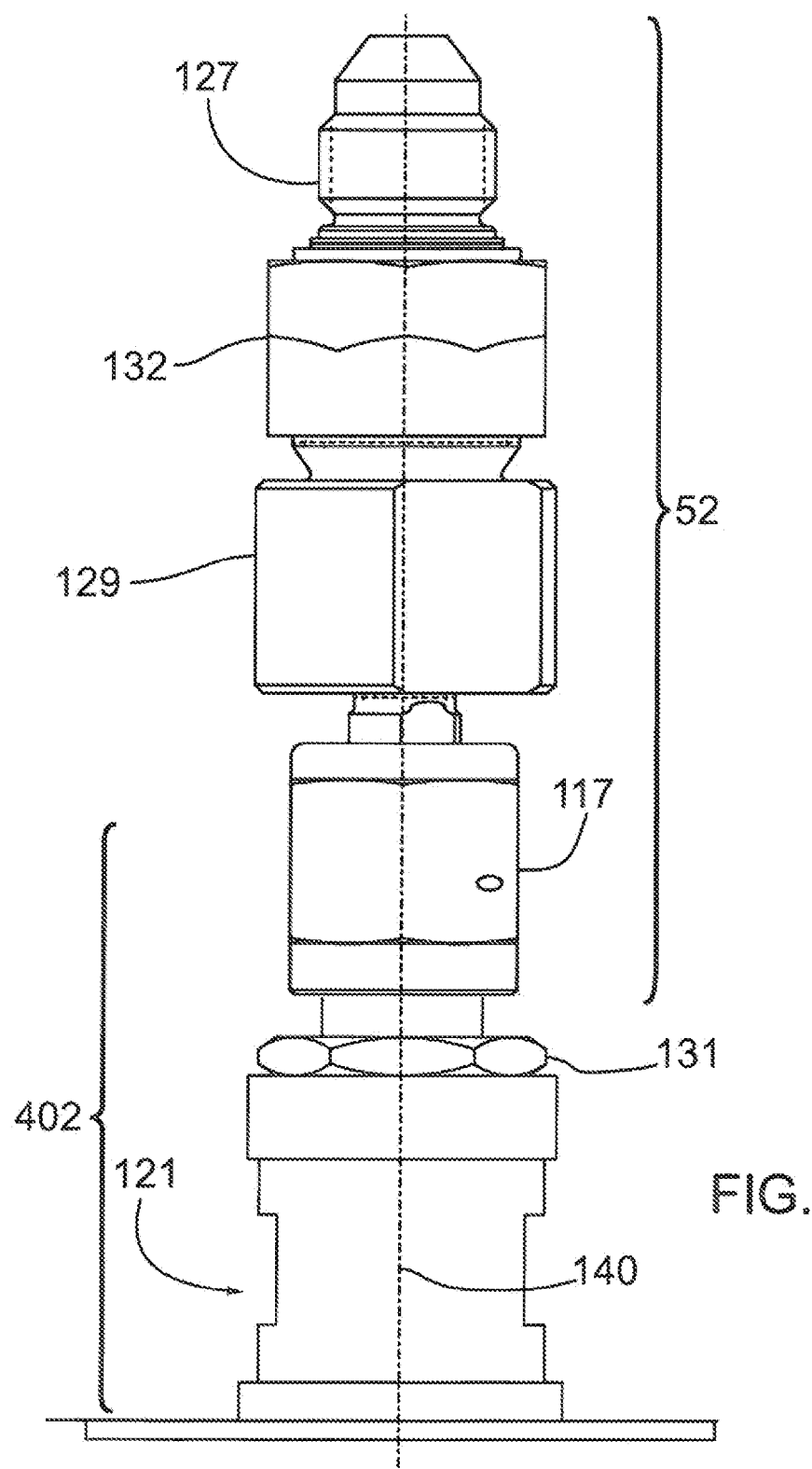
FIG. 11 shows the backup fill/drain valve engaged with the client satellite drain/fill valve on the client satellite being resupplied.

FIG. 10B shows the replacement secondary seal fitting 134 with the seal fitting threaded feature 137, the replacement secondary seal fitting torque reaction feature 135 and the seal fitting 136. FIG. 11 shows the backup fill/drain valve 52 engaged with the client satellite drain/fill valve 402 once it has been coupled thereto by the refueling tool 50.

After the client satellite propellant tank has been filled with the desired amount of propellant, if the client satellite fill/drain valve 402 is successfully closed (i.e., does not leak) then backup fill/drain valve 52 is removed by refueling tool 50 and refueling tool 50 grasps a second seal fitting 134 which is then mated to the fill/drain valve 402, which is then left behind. If, upon testing for leaks in the system after the fill/drain valve 402 is closed, valve 402 is found to leak, then the backup fill/drain valve 52 is closed, and then left behind mated to valve 402 and the secondary seal fitting 134 is attached to the backup fill/drain valve 52 by tool 50 and it too is left behind.

The thermistors are used to measure the temperature of associated equipment on all the propellant transfer subsystems and hardware supporting the subsystems. Thermistors may be included in the refueling subsystem as follows.

1) For all tanks, the thermistors are used to monitor the temperature. These temperature sensors/thermistors, along with the high pressure transducers, are used to check that the tanks are in a safe state. The thermistors and high pressure transducers, being interfaced with the computer control system (discussed below), are also used to calculate the pressure difference between interconnected tanks to predict the flow rate (and direction of flow) between them.

2) For the pressurant tanks, the thermistors, along with the high pressure transducers these are used to determine the quantity of pressurant remaining using $P \cdot V = m \cdot R \cdot T$.

3) For the transfer tanks, they are used to determine the propellant density and the tank volume as a function of temperature. The propellant mass transferred is the given by:

(number_of_cycles)*(TT_volume)*(propellant_density).

4) For the pressure transducers the thermistors are used to correct the pressure measurement as a function of temperature.

5) For the flow meter transducers, the thermistors are used to correct the flow measurement as a function of temperature. The thermistors are also used to determine the propellant density as a function of temperature. The flow meter measures the volume flow rate which is then multiplied by the propellant density to determine the mass flow rate. The computer control system, discussed below, is interfaced with all the sensors and is programmed with instructions to make the above calculations and to monitor all parts of the system.

The use of backup fill/drain valve 52 is very advantageous for several reasons. If the client fill drain valve cannot be properly closed (i.e., if it leaks), then propellant would leak from the client propulsion subsystem as soon as the refueling tool is disconnected. This situation is not acceptable and the risk of its occurrence could dissuade potential customers from consider propellant resupply of their spacecraft. This risk is mitigated through the use of the backup fill/drain valve 52. The system may be configured in such a way that backup fill/drain valve 52 also functions as a throttling valve. If the backup fill/drain valve 52 is only partially opened, then it has increased flow resistance and so can be used to regulate the flow rate of propellant. This is useful for the direct transfer method as otherwise the flow rate would be determined solely by the pressure difference between the client propellant tank and the servicer spacecraft propellant storage tank. The backup fill/drain valve 52 provides a secondary sealing of the principal flow path from the client storage tank 26 to the vacuum of space.

Referring now to FIGS. 8 and 12, an example computing system 500 forming part of the propellant resupply system is illustrated. The system includes a computer control system 525 configured, and programmed to control movement of the robotic arm 403 during the entire procedure of accessing the client satellite fill/drain valve 402, attachment of the backup fill/drain valve 52, mating of propellant outlet hoses 32 or 34 to the backup fill/drain valve 52, transfer of propellant into tanks 22 or 26, demating hoses 32 or 34 from backup fill/drain valve 52, sealing valve 52 and decoupling of the servicer spacecraft 400 from the client satellite 401.

As mentioned above, computer control system 525 is interfaced with vision system 550, the flow control system 560 of the propellant transfer system, and robotic arm 403. Previously mentioned communication system 410 is provided which is interfaced with the robotic arm 403 and configured to allow remote operation (from the Earth 408 or from any other suitable location) of the vision system (which may include one or more cameras 550), the robotic arm 403 and the flow control system 560. A system of this type is very advantageous particularly for space based systems needing remote control. By providing a suite of tool tips in a tool caddy that are accessible to the multifunction tool 540 (FIG. 12) that are configured to be activated by a single motive source on the multifunction tool (not shown) such that they do not need their own power sources provides an enormous saving in weight which is a premium on every launch.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

FIG. 12 provides an exemplary, non-limiting implementation of computer control system 525, forming part of the command and control system, which includes one or more processors 530 (for example, a CPU/microprocessor), bus 502, memory 535, which may include random access memory (RAM) and/or read only memory (ROM), one or more internal storage devices 540 (e.g. a hard disk drive, compact disk drive or internal flash memory), a power supply 545, one more communications interfaces 410, and various input/output devices and/or interfaces 555.

Although only one of each component is illustrated in FIG. 12, any number of each component can be included computer control system 525. For example, a computer typically contains a number of different data storage media. Furthermore, although bus 502 is depicted as a single connection between all of the components, it will be appreciated that the bus 502 may represent one or more circuits, devices or communication channels which link two or more of the components. For example, in personal computers, bus 502 often includes or is a motherboard.

In one embodiment, computer control system 525 may be, or include, a general purpose computer or any other hardware equivalents configured for operation in space. Computer control system 525 may also be implemented as one or more physical devices that are coupled to processor 530 through one of more communications channels or interfaces. For example, computer control system 525 can be implemented using application specific integrated circuits (ASIC). Alternatively, computer control system 525 can be implemented as a combination of hardware and software, where the software is loaded into the processor from the memory or over a network connection.

Computer control system 525 may be programmed with a set of instructions which when executed in the processor causes the system to perform one or more methods described in the present disclosure. Computer control system 525 may include many more or less components than those shown.

While some embodiments have been described in the context of fully functioning computers and computer systems, those skilled in the art will appreciate that various embodiments are capable of being distributed as a program product in a variety of forms and are capable of being applied regardless of the particular type of machine or computer readable media used to actually effect the distribution.

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

The present system is advantageous over the system disclosed in Scott Rotenberger, David SooHoo, Gabriel Abraham, Orbital Express Fluid Transfer Demonstration System in *Sensors and Systems for Space Applications II*, edited by Richard T. Howard, Pejmun Motaghedi, Proc. of SPIE Vol. 6958, 695808, (2008) for the following reasons. Rotenberger needs to fill and pressurize a transfer tank to 50 Pounds per Square Inch Differential (psid) and perform unregulated blow down to the desired client fill and pressure by executing a number of "blow and refill" cycles. Through this unregulated approach, there is a significant difference between the initial transfer pressure and final pressure when the transfer cycle is about to be completed. Consequently there is a large difference between initial flow rate and the final flow rate (i.e., large dynamic range), making accurate mass flow rate measurement difficult to achieve.

The present systems maintains a virtual storage tank preferably at about 20 bar (but is not restricted to this pressure) and directly regulates the exit flow of propellant so that the transfer flow rate is safe and the pressure is increased in the client satellite in a continuous, controlled, and slow manner. The fluid transfer system disclosed herein conserves pressurant in this way and it is possible to regulate the flow to be whatever is required at any time during the propellant transfer procedure. A flow meter measures the flow rate and this can be used directly for feedback.

In addition, the flow rate regulation features incorporated above preclude the need to modify features of the client propulsion system such changing the client tank inlet configuration as Rotenberger et al. were required to do.

While the system disclosed herein has been described as a remote propellant transfer system for resupplying satellites in orbit once the propellant has been depleted or partially depleted, it will be understood the present system may also be used for safely transferring propellant to satellites prior to being launched into space. In this context, no direct human contact is needed during the fueling procedure since the whole process can be remotely controlled from a safe distance. In this situation the fueling is done prior to sealing the thermal blankets and wiring the valves with the various lockwires so these would not have to be cut off in the pre-launch scenario.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A system mounted on a servicer spacecraft for transferring fluid to a client satellite, the client satellite including at least one storage tank having at least a first fluid transfer coupling, comprising:
    a) a fluid storage and routing system for storing and routing fluid from said servicing spacecraft to the at least one storage tank on the client satellite, said storage and routing system including
        at least one pressurized tank containing a pressurized gas, at least one fluid storage tank, and an associated fluid transfer coupling,
        first and second flow paths connecting said at least one fluid storage tank, said at least one pressurized gas tank and said associated fluid transfer coupling; and
    b) a flow control system configured for
        detecting and adjusting pressure and flow rate of said gas and fluid through said first and second flow paths,
        detecting pressure in the at least one storage tank on the client satellite once said associated fluid transfer coupling is coupled to the fluid transfer coupling on the client satellite,
        transferring fluid from said fluid tank, using pressurized gas from said pressurized gas tank, to said at least one storage tank on the client satellite via said first flow path at a pressure less than or equal to a pressure of the at least one pressurized gas tank, or via said second flow path at a pressure greater than a pressure of the at least one pressurized gas tank.

2. The system according to claim 1 further comprising a command and control system interfaced with said flow control system, said command and control system being configured to regulate pressure and flow rate of fluid between said at least one fluid storage tank and the at least one storage tank on the client satellite based on a detected pressure of the least one storage tank on the client satellite.

3. The system according to claim 2 further comprising a communication system configured to provide communication between said command and control system and a remote operator for remote teleoperator control, supervised autonomous control, or fully autonomous control of fluid transfer operations between the servicer spacecraft and the client satellite.

4. The system according to claim 3 further comprising a vision system mounted and configured to provide real time images of all fluid transfer operations, said vision system being connected to said communication system for transmitting said images to a teleoperator during teleoperation.

5. The system according to claim 3 further comprising a vision system mounted and configured to provide real time images of all fluid transfer operations, said vision system being connected to said communication system for transmitting said images and being configured to be used in an autonomous control system.

6. The system according to claim 1 wherein said at least a first fluid transfer coupling includes at least one fill/drain valve, and further including a backup fill/drain valve configured to be mated to said at least one fill/drain.

7. A system mounted on a servicer spacecraft for transferring fluid to a client satellite, the client satellite including at least one storage tank having at least a first fluid transfer coupling, comprising:

a) means for storing and routing fluid from said servicing spacecraft to the at least one storage tank on the client satellite; and
b) means for controlling flow of gas and fluid, said means for controlling flow of gas and fluid configured for
   detecting and adjusting pressure and flow rate of said gas and fluid through said first and second flow paths,
   detecting pressure in the at least one storage tank on the client satellite once said associated fluid transfer coupling is coupled to the fluid transfer coupling on the client satellite,
   transferring fluid from said fluid tank to said least one storage tank on the client satellite using the pressurized gas
      via said first flow path at a pressure less than or equal to a pressure of the at least one pressurized gas tank, or
      via said second flow path at a pressure greater than a pressure of the at least one pressurized gas tank.

8. The system according to claim 7 wherein said means for storing and routing fluid includes
   at least one pressurized tank containing a pressurized gas, at least one fluid storage tank, and an associated fluid transfer coupling,
   first and second flow paths connecting said at least one fluid storage tank, said at least one pressurized gas tank and said associated fluid transfer coupling.

9. The system according to claim 7 further comprising means for command and control interfaced with said means for controlling flow of gas and fluid, said means for command and control system being configured to regulate pressure and flow rate of fluid between said at least one fluid storage tank and the at least one storage tank on the client satellite based on a detected pressure of the least one storage tank on the client satellite.

10. The system according to claim 9 further comprising a means for communication for providing communication between said means for command and control and a remote operator for remote teleoperator control, or a mixture of teleoperator control and supervised autonomy control, or fully autonomous control of fluid transfer operations between the servicer spacecraft and the client satellite.

11. The system according to claim 8 further comprising means for viewing all fluid transfer operations and being connected to said communication system for transmitting images to a teleoperator during teleoperation.

12. The system according to claim 11 wherein said means for viewing includes one or more optical cameras mounted one or more fields of view encompassing a zone in which fluid transfer from the servicer satellite to the client satellite is visible.

13. A propellant transfer system for transferring propellant between a servicer spacecraft and a client satellite, the client satellite having a client satellite propellant tank and a propellant tank fill/drain valve, comprising:
   a) at least one propellant transfer subsystem mounted on the servicer spacecraft, each of said at least one propellant transfer system including
      at least one pressurized tank containing a pressurized gas, at least one propellant storage tank, said at least one propellant storage tank and said at least one pressurized gas tank being in flow communication with each other through a routing tube system;
   b) a flow control system integrated with said routing tube system, said flow control system configured for
      detecting and adjusting pressure and flow rate of said pressurized gas and propellant, and
      detecting pressure in the client satellite propellant storage tank once the propellant transfer subsystem is coupled to the client satellite and the fill/drain valve on the client satellite propellant tank is open,
   c) a command and control system interfaced with the flow control system of each of said at least one propellant transfer subsystem, said command and control system being configured to regulate pressure and flow rate of propellant between each of said at least one propellant transfer subsystem and the client satellite propellant tank based on a detected pressure of the client satellite propellant tank; and
   d) a communication system configured to provide communication between said command and control system and a remote operator for remote teleoperator control, or a mixture of teleoperator control and supervised autonomy control, or fully autonomous control of propellant transfer operations between the servicer spacecraft and the client satellite.

14. The propellant transfer system according to claim 13 wherein said command and control system includes a computer control system mounted on the servicer spacecraft interfaced with the flow control system of each of said at least one propellant transfer subsystem, said computer control system being configured, and programmed with instructions, to regulate pressure and flow rate of propellant between each propellant transfer subsystem and the client satellite propellant tank based on a detected pressure of the client satellite propellant tank.

15. The propellant transfer system according to claim 13 wherein said flow control system is configured for bi-directional transfer of propellant between said servicer spacecraft and said client satellite.

16. The propellant transfer system according to claim 13 including a backup fill/drain valve configured to be mated to said propellant fill/drain valve located on a client satellite.

17. The fluid transfer system according to claim 13 wherein said flow control system includes a plurality of valves, leak detectors, pressure sensors, gas pressure regulators, temperature sensors flow sensors and meters interfaced with said computer control system and stationed in strategic locations in said routing tube system.

18. The fluid transfer system according to claim 12 wherein said flow control system is configured for monitoring pressure over periods of time in said routing tube system.

19. The fluid transfer system according to claim 18 wherein the periods of time include periods of time both before and after opening the client satellite fill/drain valve, and before and after transferring propellant to the client satellite.

20. The propellant transfer system according to claim 13 wherein said command and control system is programmed with instructions such that upon detection of a pressure in the client satellite propellant tank that is lower than that of the servicer spacecraft's propellant storage tank, it commands said at least one propellant transfer system to provide regulated pressure and flow rate of pressurized gas between said at least one pressurized gas tank and said at least one propellant storage tank thereby transferring propellant between said at least one propellant storage tank and said propellant outlet.

21. The fluid transfer system according to claim 13 where said at least one propellant subsystem further includes at least one propellant transfer tank in flow communication with said at least one propellant storage tank, said pressurized gas tank and said one propellant outlet through said routing tube system, and wherein said at least one transfer tank includes separate gas and fluid volumes which are variable and sum to a total available volume of an interior of the at least one transfer tank, said routing tube system being configured such that said gas volume
   is in flow communication with said at least one pressurized gas tank and said at least one propellant storage tank, and can be vented into space,
and wherein said fluid volume is in flow communication with said at least one propellant storage tank and said propellant outlet.

22. The propellant transfer system according to claim 21 wherein said command and control system is programmed with instructions such that upon detection of a pressure in the client satellite propellant tank that is higher than that of the servicer spacecraft's propellant storage tank up to a set point for pressure regulators in a high pressure section tubing system associated with said at least one pressurized gas tank, it commands said at least one propellant transfer system to provide regulated pressure and flow rate through said at least one propellant subsystem from said at least one storage tank to said fluid volume of said at least one propellant transfer tank facilitated by instructing the flow control system to vent said gas volume of said transfer tank to space and to open a flow path between said at least one propellant storage tank and said fluid volume, and after a desired quantity of propellant has transferred to said fluid volume instructing said flow control system to cease venting said gas volume to space and to close said flow path, and thereafter it commands the flow control system to pressurize the gas volume and to open a flow path from said fluid volume to said propellant outlet thereby propellant from said fluid volume to said propellant outlet and into the client satellite storage tank.

23. The propellant transfer system according to claim 13 wherein said at least one propellant subsystem includes first and second propellant subsystems, said first and second propellant subsystems being configured to transfer bipropellant to client satellites configured for bipropellant propulsion, wherein said first propellant subsystem stores fuel, and wherein said second propellant subsystem stores oxidizer.

24. The propellant transfer system according to claim 13 wherein said at least one propellant subsystem includes first, second and third propellant subsystems, said first and second propellant subsystems being configured to transfer bipropellant to client satellites configured for bipropellant propulsion, and said third propellant subsystem being configured to transfer monopropellant to client satellites configured for monopropellant propulsion.

25. The propellant transfer system according to claim 13 wherein said at least one propellant transfer subsystem is connected, through said routing tube system, with at least one propulsion interface to supply propellant to the servicer spacecraft propulsion system.

26. A propellant transfer system mounted on a servicer satellite for transferring bipropellant and/or monopropellant between the servicer satellite and propellant tank of client satellites configured for propulsion with bipropellant and/or monopropellant respectively, each client satellite having a fill/drain valve associated with each propellant tank for accessing the propellant storage tank, comprising:
   a) first, second and third propellant transfer subsystems, each propellant transfer subsystem including,
      at least one pressurized tank containing a pressurized gas, at least one propellant storage tank, said at least one propellant storage tank and said at least one pressurized gas tank being in flow communication with each other through a routing tube system;
   b) a flow control system integrated with said interconnecting tube system for
      detecting and adjusting pressure and flow rate of said pressurized gas and propellant, and
      detecting pressure in the client satellite propellant storage tank once the propellant transfer subsystem is coupled to the client satellite and the fill/drain valve on the client satellite propellant tank is open,
   c) a command and control system interfaced with the flow control system of each propellant transfer subsystem, said command and control system being configured to regulate pressure and flow rate of propellant between each propellant transfer subsystem and associated client satellite propellant tanks based on a detected pressure of the client satellite propellant tank; and
   d) a communication system configured to provide communication between said command and control system and a remote operator for remote teleoperator control, or a mixture of teleoperator control and supervised autonomy control, or fully autonomous control of propellant transfer operations between said first, second and third propellant transfer subsystems and said client satellite propellant tanks and the associated propellant tanks on the client satellite.

27. The propellant transfer system according to claim 26 wherein said command and control system includes a computer control system mounted on the servicer spacecraft interfaced with the flow control system of each propellant transfer subsystem, said computer control system being configured, and programmed with instructions, to regulate pressure and flow rate of propellant between each propellant transfer subsystem and the associated client satellite propellant tank based on a detected pressure of the client satellite propellant tank.

28. The propellant transfer system according to claim 26 wherein propellant in said storage tank in said first propellant transfer subsystem is fuel, wherein propellant contained in said storage tank in said second propellant transfer subsystem is oxidizer, wherein the fuel and the oxidizer form a bipropellant for a satellite configured for bipropellant propulsion, wherein the satellite configured for bipropellant propulsion has a first propellant storage tank for holding fuel and a second propellant storage tank for holding oxidizer, wherein the first and second propellant transfer subsystems are configured to mate with the fill/drain valves on the first and second propellant storage tanks respectively, and wherein the propellant contained in said storage tank in said third propellant transfer subsystem is a monopropellant for refueling satellites configured for monopropellant propulsion, wherein the satellite configured for monopropellant propulsion has a monopropellant storage tank, and wherein the third propellant transfer subsystem is configured to mate with the fill/drain valve of the monopropellant storage tank.

29. A system mounted on a servicer spacecraft for transferring fluid to a client satellite, the client satellite including at least one storage tank having at least a first fluid transfer coupling, comprising:
   a) a fluid storage and routing system for storing and routing fluid from said servicing spacecraft to the at least one storage tank on the client satellite, said storage and routing system including
      at least one pressurized tank containing a pressurized gas, at least one fluid storage tank, and an associated fluid transfer coupling, first and second flow paths connecting said at least one fluid storage tank, said at least one pressurized gas tank and said associated fluid transfer coupling, a pump in said flow path; and b) a flow control system configured for detecting and adjusting pressure and flow rate of said gas and fluid through said first and second flow paths, detecting pressure in the at least one storage tank on the client satellite once said associated fluid transfer coupling is coupled to the fluid transfer coupling on the client satellite, activating said pump for transferring fluid from said fluid tank to said at least one storage tank on the client satellite via said flow path at a pressure less than or equal to a pressure of the at least one pressurized gas tank, or via said second flow path without the pump at a pressure greater than a pressure of the at least one pressurized gas tank.

* * * * *